(12) United States Patent
Miura

(10) Patent No.: US 6,935,100 B2
(45) Date of Patent: Aug. 30, 2005

(54) METHOD FOR WARM-UP CATALYST OF EXHAUST GAS TREATMENT DEVICE

(75) Inventor: Manabu Miura, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/296,998

(22) PCT Filed: Jul. 5, 2002

(86) PCT No.: PCT/JP02/06829

§ 371 (c)(1),
(2), (4) Date: Dec. 2, 2002

(87) PCT Pub. No.: WO03/012265

PCT Pub. Date: Feb. 13, 2003

(65) Prior Publication Data

US 2004/0000136 A1 Jan. 1, 2004

(30) Foreign Application Priority Data

Jul. 30, 2001 (JP) ........................................ 2001-228837

(51) Int. Cl.[7] .............................................. F01N 3/00
(52) U.S. Cl. ............................. 60/284; 60/274; 60/278; 60/280; 60/285; 60/286
(58) Field of Search ....................... 60/274, 278, 285, 60/286, 299, 280, 284

(56) References Cited

U.S. PATENT DOCUMENTS

| 5,845,492 | A | | 12/1998 | Isobe et al. | |
|---|---|---|---|---|---|
| 5,974,792 | A | * | 11/1999 | Isobe | 60/278 |
| RE36,737 | E | | 6/2000 | Brehob et al. | |
| 6,240,721 | B1 | * | 6/2001 | Ito et al. | 60/274 |
| 6,266,956 | B1 | * | 7/2001 | Suzuki et al. | 60/278 |
| 6,516,608 | B1 | * | 2/2003 | Poggio et al. | 60/284 |

FOREIGN PATENT DOCUMENTS

| EP | 1 167 727 A2 | 1/2002 |
|---|---|---|
| JP | 2000-18024 A | 1/2000 |

OTHER PUBLICATIONS

Patent Abstracts of Japan, vol. 2000, No. 04, Aug. 31, 2000, JP 2000–018024.

* cited by examiner

*Primary Examiner*—Thomas Denion
*Assistant Examiner*—Diem Tran
(74) *Attorney, Agent, or Firm*—Foley & Lardner LLP

(57) ABSTRACT

A method of controlling an internal combustion engine for warm-up of catalyst of an exhaust gas treatment device is disclosed. The method comprises generating a warm-up demand for heating the catalyst subject to constraint on stable combustion. Based on the warm-up demand, a reduction in excess air ratio is determined. A desired value in excess air ratio is modified by the reduction to provide a modified desired value in excess air ratio. Based on the reduction, a desired value in EGR rate is modified to provide a modified desired value in EGR rate. Based on the modified desired value in EGR rate, an EGR command signal is determined.

37 Claims, 34 Drawing Sheets

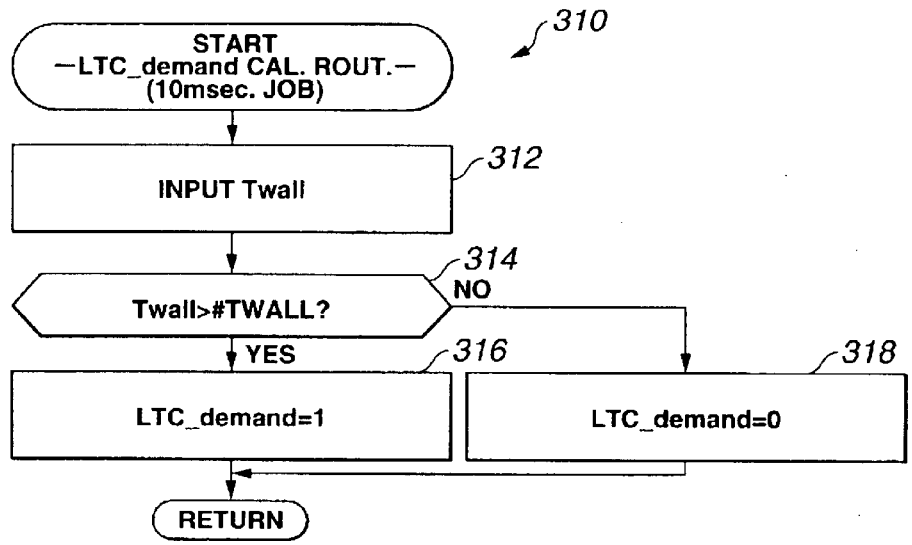
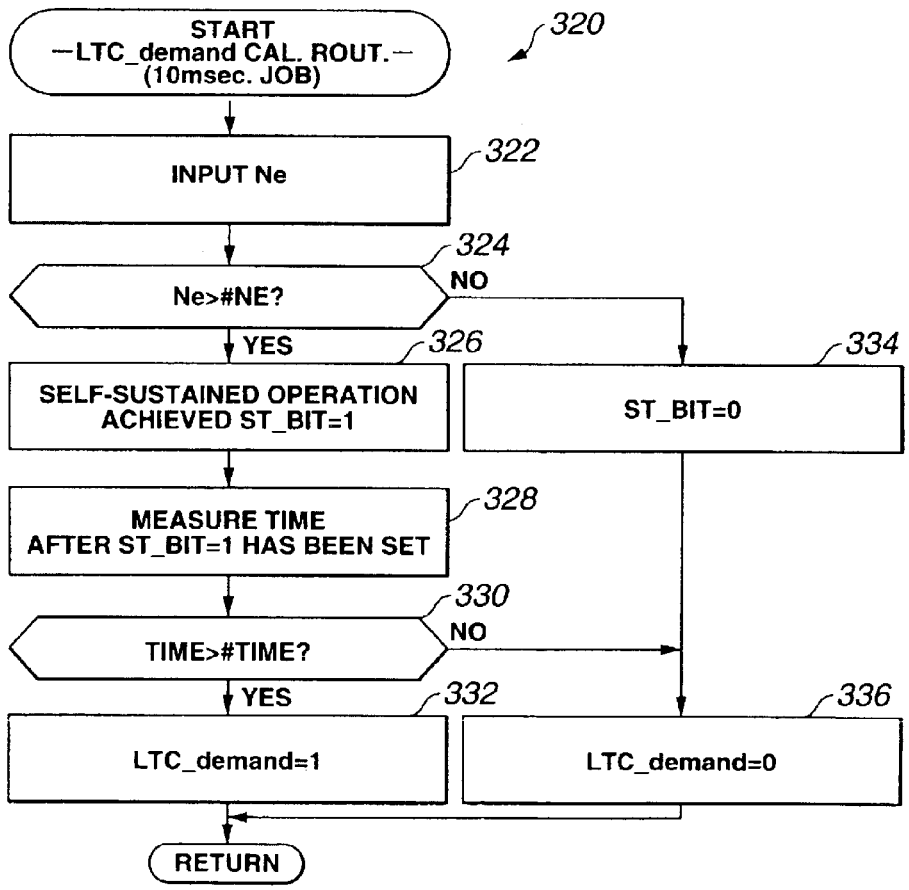

METHOD FOR WARM-UP CATALYST OF EXHAUST GAS TREATMENT DEVICE

BACKGROUND OF THE INVENTION

The present invention relates to a method of controlling an internal combustion engine for warm-up of catalyst of an exhaust gas treatment device.

In internal combustion engines, particularly diesel engines, an excess air ratio is reduced to increase the temperature of catalyst of an exhaust gas treatment device upon and after cold start. An example of such technique is disclosed in JP P2000-18024A published Jan. 18, 2000. According to this example, an intake throttle valve and an EGR valve are adjusted to maintain an excess air ratio falling in a range from 1.5 to 1.0 to reduce intake air charge for warm-up of catalyst of an exhaust gas treatment device. The prior art technique is satisfactory, but a need remains for improving such technique by regulating an EGR rate in close cooperation with an excess air ratio for rapid warm-up of catalyst, good emission performance and stable combustion.

SUMMARY OF THE INVENTION

An object of the present invention is to provide a method of controlling an internal combustion engine for warm-up of catalyst of an exhaust gas treatment device by regulating an EGR rate in close cooperation with an excess air ratio for rapid warm-up of catalyst, good emission performance and stable combustion.

One of exemplary embodiments according to the present invention provides a method of controlling an internal combustion engine for warm-up of catalyst of an exhaust gas treatment device located in the engine exhaust path, the engine including an exhaust gas recirculation (EGR) system driven in response to an EGR command signal to recirculate exhaust to an engine intake, the method comprising:

generating a warm-up demand for heating the catalyst subject to constraint on stable combustion;

determining a reduction in excess air ratio of the engine intake based on the warm-up demand;

modifying a desired value in excess air ratio by the reduction to provide a modified desired value in excess air ratio;

modifying a desired value in EGR rate based on the reduction to provide a modified desired value in EGR rate; and determining the EGR command signal based on the modified desired value in EGR rate.

BRIEF DESCRIPTION OF THE DRAWINGS

Further objects and advantages of the invention will be apparent from reading of the following description in conjunction with the accompanying drawings.

FIG. 21 is a flow diagram of one example of an LTC_demand calculation routine of the invention.

FIG. 22 is a flow diagram of another example of an LTC_demand calculation routine of the invention.

DESCRIPTION OF THE EXEMPLARY EMBODIMENTS

Figure 1:
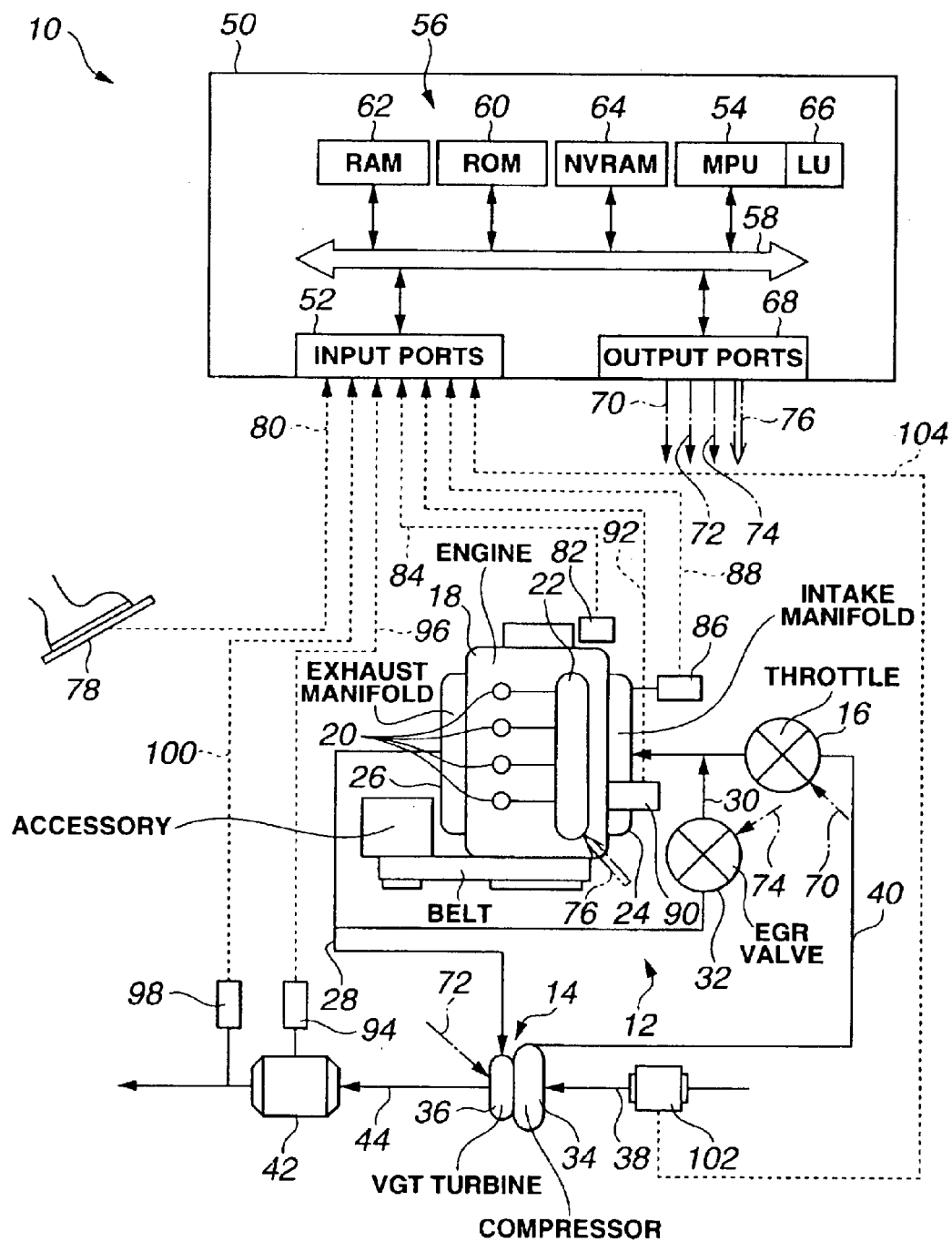
FIG. 1 is a schematic diagram of an internal combustion engine and engine control system made in accordance with an embodiment of the present invention.

Turning first to FIG. 1, there is shown a simplified schematic diagram of a compression ignition engine system 10 equipped with an exhaust gas recirculation (EGR) system 12 and a variable geometry turbocharger (VGT) 14. Engine system 10 is further equipped with an intake air throttle valve (TV) 16. A representative engine block 18 is shown having four fuel injectors 20 positioned for direct fuel injection into four combustion chambers, not shown, respectively. Fuel injectors 20 receive pressurized fuel from a common rail 22. Air enters the combustion chambers through an intake manifold 24 and combustion exhaust gases are exhausted through an exhaust manifold 26 in the direction of arrow 28.

EGR system 12 connects exhaust manifold 26 to intake manifold 24. This allows a portion of the exhaust gases to be circulated from exhaust manifold 26 to intake manifold 24 in the direction of arrow 30. A variable flow EGR valve 32 regulates the amount of exhaust gas recirculated from exhaust manifold 26. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

The VGT 14 includes a compressor 34 and a turbine 36. The turbo charger uses exhaust gas energy to increase the mass of air charge delivered to the combustion chambers. The exhaust gas flowing in the direction of arrow 28 drives the turbine 36. Turbine 36 drives compressor 34, which is typically mounted on the same shaft. The turning compressor 34 compresses ambient air 38 and directs compressed air in the direction of arrow 40 into intake manifold 24, thus creating turbo boost pressure that develops more torque and power during combustion as compared to naturally aspirated, non-turbocharged engines.

An exhaust gas treatment device 42 is located in the engine exhaust path through which exhaust gases flow in the direction of arrow 44 from turbine 36. Exhaust gas treatment device 42 is a catalytic converter system and processes the engine exhaust gases.

A variable geometry turbocharger has moveable components in addition to the rotor group. These moveable components can change the turbocharger geometry by changing the area or areas in the turbine stage through which exhaust gases from the engine flow, and/or changing the angle at which the exhaust gases enter or leave the turbine. Depending upon the turbocharger geometry, the turbocharger supplies varying amounts of turbo boost pressure to the engine. The variable geometry turbocharger may be electronically controlled to vary the amount of turbo boost pressure.

In a variable geometry turbocharger, the turbine housing is oversized for an engine, and the gas flow is choked down to the desired level. There are several designs for the variable geometry turbocharger. In one design, a variable inlet nozzle has a cascade of moveable vanes that are positionable to change the area and angle at which the gas flow enters the turbine wheel. In another design, the turbocharger has a moveable sidewall, which varies the effective cross sectional area of the turbine housing. It is appreciated that embodiments of the present invention are not limited to any particular structure for the variable geometry turbocharger. That is, the term VGT as used herein means any controllable air-pressurizing device including the above examples, and including a modulated waste gate valve.

With continuing reference to FIG. 1, various sensors are in electrical communication with a controller 50 via input ports 52. Controller 50 preferably includes a microprocessor 54 in communication with various computer readable storage media 56 via data and control bus 58. Computer readable storage media 56 may include any number of known devices that function as read only memory 60, random access memory 62, and nonvolatile random access memory 64.

Computer readable storage media 56 have instructions stored thereon that are executable by controller to perform methods of controlling the engine 10, including throttle valve 16, VGT 14 and EGR valve 32. Optionally, methods of controlling the engine 10 include an injection of post combustion fuel after ignition of in-cylinder mixture for regulating the temperature of exhaust gas treatment device 42. The program instructions enable controller 50 to control the various systems and subsystems of the vehicle, with the instructions being executed by microprocessor 54. Optionally, instructions may also be executed by any number of logic units 66. Input ports 52 receive signals from various sensors and controller 50 generates signals at output ports 68 that are directed to the various vehicle components.

A data, diagnostics, and programming interface may also be selectively connected to controller 50 via a plug to exchange various information therebetween. The interface may be used to change values within the computer readable storage media, such as configuration settings, calibration variables, and instructions for TV, VGT and EGR control and others.

In operation, controller 50 receives signals from various vehicle sensors and executes control logic embedded in hardware and/or software to control the engine. In an exemplary embodiment, controller 50 is the ECCS control unit available from Nissan Motor Company Limited, Yokohama, Japan.

As is appreciated by one of ordinary skill in the art, control logic may be implemented in hardware, firmware, software, or combinations thereof. Further, controller 50 may execute control logic, in addition to any of the various systems and subsystems of the vehicle cooperating with controller 50. Further, although in exemplary embodiments, controller 50 includes microprocessor 54, any of a number of known programming and processing techniques or strategy may be used to control an engine in accordance with the present invention.

Further, it is to be appreciated that the engine controller may receive information in a variety of ways. For example, engine systems information could be received over a data link, at a digital input or at a sensor input of the engine controller.

In an exemplary embodiment, controller 50 controls all of the engine systems including TV 16, VGT 14, EGR valve 32 and fuel control. For example, command signal 70 from controller 50 regulates the throttle valve opening (TVO) position, signal 72 regulates the VGT position, and signal 74 regulates the EGR valve position. Likewise, command signals 76 from the controller 50 regulate injection timing, quantity of fuel and common rail pressure.

In controller 50, command signals 70, 72, 74 and 76 are calculated from measured variables and engine operating parameters by means of a control algorithm. Sensors and calibratable look-up maps and/or tables provide controller 50 with engine operating information. For example, an accelerator sensor 78 provides a signal 80 to controller 50 indicative of an accelerator pedal opening (APO) or angle. Likewise, a crankshaft sensor 82 provides a POS signal 84 to controller indicative of a crank position. It also provides cylinder identification signals to controller 50. Further, an engine coolant temperature sensor 86 provides a signal 88 to controller 50 indicative of coolant temperature Tw of the engine. In an exemplary embodiment, a cylinder wall temperature sensor 90 provides controller 50 a signal 92 indicative of a cylinder wall temperature Twall of the engine. In the embodiment and another exemplary embodiment, a catalyst bed temperature sensor 94 provides controller 50 a signal 96 indicative of a catalyst bed temperature Tbed within exhaust gas treatment device 42. In other embodiment, a catalyst-out temperature sensor 98 provides a signal 100 to controller 50 indicative of an exhaust gas temperature Tcat-out at an outlet of exhaust gas treatment device 42. Additional sensory inputs can also be received by controller 50 such as a signal from an airflow sensor 102 indicative of a mass airflow Qa upstream of compressor 34, In an exemplary embodiment of the present invention, the various techniques utilized to determine TV, VGT and EGR command signals 70, 72 and 74 are shown in FIG. 2.

Figure 2:
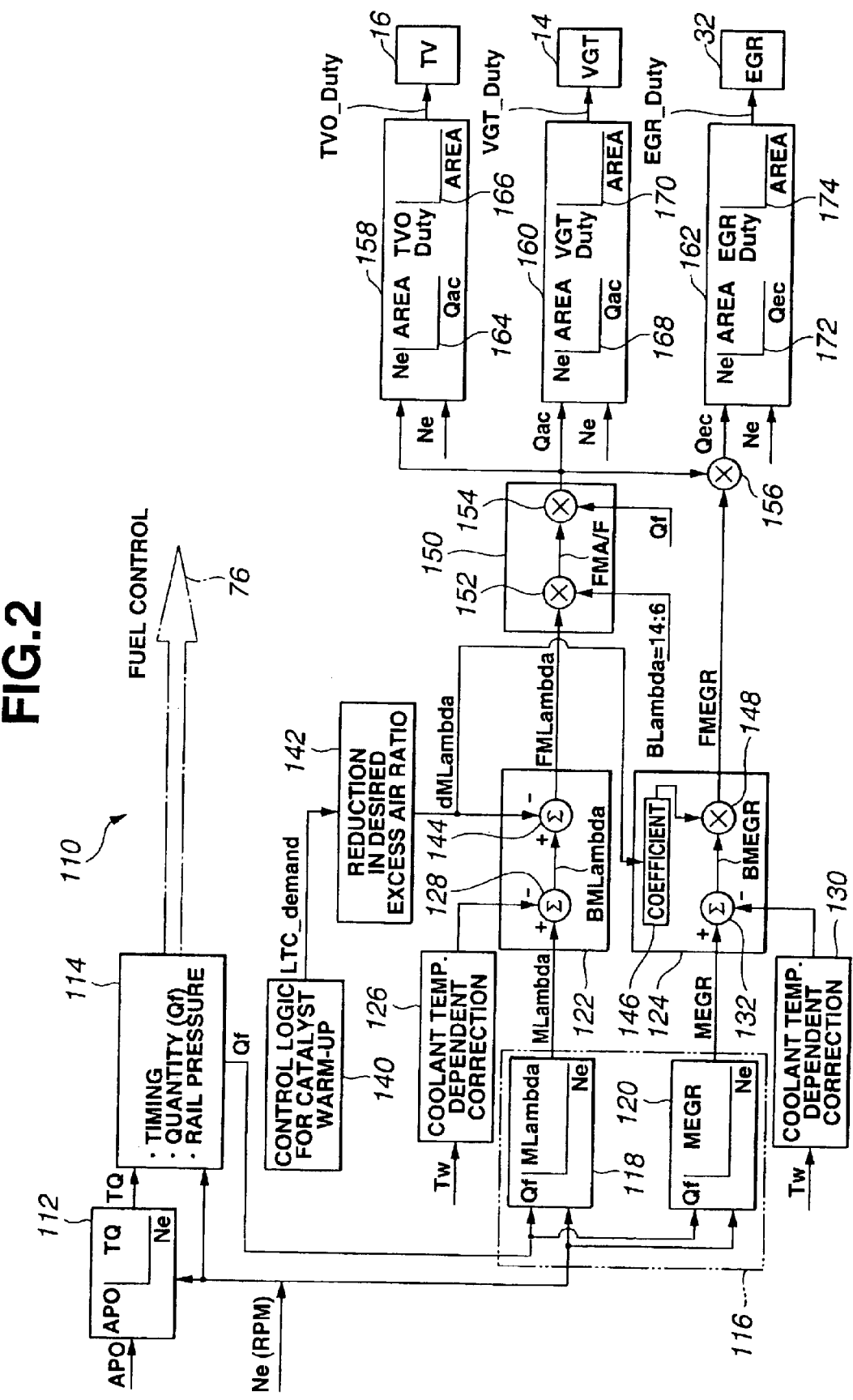
FIG. 2 is a block diagram illustrating the engine control system of the present invention.

In FIG. 2, a block diagram 110 illustrates the functions of the control logic, including instructions, executed by controller 50 to provide enhanced engine control for warm-up of catalyst of exhaust gas treatment device 42 and improved emission control upon and after cold start. Embodiments of the present invention are particularly useful to reduce warm-up time of catalyst and improve emissions on diesel engines upon and after cold start. Using EGR technology to mix a portion of exhaust gas with the intake charge reduces emissions of oxides of nitrogen (NOx). In a turbo diesel engine, the back pressure necessary to drive the EGR flow from exhaust to intake manifolds 26 and 24 is accomplished with VGT 14. The control of EGR flow rate may be achieved via VGT geometry change (for example, vane position change or waste gate position change), and via EGR valve position change, and preferably via both.

As will be understood as the discussion proceeds, there are many aspects of the present invention that may be used separately or together.

With continuing reference to FIG. 2, in the embodiment illustrated, an accelerator position sensor input APO and an engine speed input Ne (rpm) are received at block 112. Block 112 utilizes a look-up map to determine an engine torque demand TQ. Although not shown, an appropriate filter, such as a one-way second order filter, adds some delay to torque demand TQ. Delay is added to allow the slower, air flow aspects of engine control to catch up to the faster responding torque demand aspects of engine control. At block 114, engine speed Ne and filtered torque demand TQ are received, and processed along with other engine conditions, resulting in desired fuel injection timing, quantity Qf, and rail pressure. These factors control fuel delivery, indicated at 76.

At set-point generating block 116 illustrated by two-dot chain line, a desired chemical composition for the intake air to the warmed-up engine is determined. The desired chemical composition is in terms of excess air ratio and EGR rate. Fuel quantity per cycle Qf is provided to block 116 from injection control block 114. Engine speed Ne is also provided to block 116. The set point values in block 116 are contained within look-up maps for excess air ratio and for EGR rate 118 and 20. Look-up map 118 establishes set point values of excess air ratio for various engine speed and fuel quantity (per cycle) conditions. Likewise, look-up map 120 establishes set point values of EGR rate for various engine speed and fuel quantity (per cycle) conditions. Block 116 provides an excess air ratio set point value MLambda and an EGR rate set point value MEGR to blocks 122 and 124, respectively.

At block 122, a desired or base value of excess air ratio BMLambda accounting for engine coolant temperature is determined. Likewise, at block 124, a desired or base value of EGR rate BMEGR accounting for engine coolant temperature is determined. These desired values are determined by correcting the set point values MLambda and MEGR depending upon a coolant temperature sensor input Tw. From block 126, one coolant temperature dependent correction value is determined. Summing point 128 within block 122 subtracts the correction value provided by block 126 from set point value MLambda to determine desired value BMLambda. Likewise, from block 130, another coolant temperature dependent correction value is determined. Summing point 132 within block 124 subtracts the correction value provided by block 130 from set point value MEGR to determine desired value BMEGR. Block 126 contains correction values for various engine coolant temperature, speed and fuel quantity, by which set point values MLambda of excess air ratio are reduced for warm-up of cylinder wall. Block 130 contains correction values for various engine coolant temperature, speed and fuel quantity, by which set point values MEGR of EGR rate are reduced for creation of improved combustion environment during the warm-up. Blocks 126 and 130 will be specifically described again later in connection with FIGS. 31 and 33, respectively.

Logic block 140 determines a warm-up demand LTC_demand for warm-up of catalyst of exhaust gas treatment device 42. In some of embodiments, LTC_demand is represented by one of two values 0 and 1. In other of the embodiments, LTC_demand is represented by one of any values that are not less than 0 and not greater than 1. In the embodiments, determination by logic block 140 always gives a result that LTC_demand is 0 unless measure or estimate of cylinder wall temperature condition allows the engine to operate with a further reduced excess air ratio upon receiving a need for heating the catalyst. After the cylinder wall temperature condition has increased sufficiently, logic block 140 always gives another result that LTC_demand is 1 upon receiving a need for heating the catalyst. There are variations in logic that may be used in block 140. Such variations are not specifically described now, but they will be described later in connection with FIGS. 6, 7A–7D, 8A–8D, 9A–9D, 10, 11A–11D, 15A–15D, and 19–29.

LTC_demand from block 140 is received by excess air ratio reduction determining block 142 that determines a reduction in excess air ratio dMLambda based on LTC_demand. Block 142 contains at least one value for outputting as dMLambda when LTC_demand is 1. A number of values may be contained within block 142 in a retrievable manner for various engine conditions. The output dMLambda is provided to block 122. Block 142 will be later described again in connection with FIG. 31.

Within excess air ratio modifier block 122, another summing point 144 receives BMLambda from the first summing point 128 and dMLambda from reduction in excess air ratio determination block 142 to determine a modified or final desired value FMLambda of excess air ratio. At summing point 144, FMLambda is given by subtracting dMLambda from BMLambda (FMLambda=BMLambda−dMLambda). That is, dMLambda may be expressd in terms of a difference between BMLambda and FMLambda (dMLambda= BMLambda−FMLambda).

A reduction in excess air ratio derived from the process of modifying the desired value BMLambda using dMLambda influences the process of modifying the desired value BMEGR within EGR rate modifier block 124. Within block 124, a coefficient block 146 determines the reduction in excess air ratio. This determination may be made by calculating a difference between BMLambda and FMLambda or by receiving dMLambda from block 142. The coefficient block 146 determines an EGR correction coefficient $K_{EGR}$ Various coefficient values are contained within block 146 for at least dMLambda conditions. Preferably, the coefficient values contained within block 146 are arranged in retrievable manner for dMLambda and FMLambda conditions. The coefficient values have an upper limit of 1. The coefficient block 146 will be later described again in connection with FIG. 33.

Block 124 modifies desired value BMEGR based on the reduction dMLambda. Within the block 124, the coefficient $K_{EGR}$ serves as a modulator on BMEGR in such a manner that the more dMLambda, the more the correction amount by which BMEGR is reduced increases. In the illustrated embodiment, with the same FMLambda, the coefficient $K_{EGR}$ decreases from 1 as dMLambda increases. Further, with the same dMLambda, the coefficient $K_{EGR}$ increases toward 1 as FMLambda increases. A multiplying point 148 receives $K_{EGR}$ from coefficient block 146 and modifies the desired value BMEGR by calculating a multiplication of $K_{EGR}$ with BMEGR to determine a modified desired value FMEGR.

The modified desired values FMLambda and FMEGR are used to calculate desired air quantity Qac per cycle and desired EGR gas quantity Qec per cycle. From block 122, FMLambda is provided to an air quantity calculation block 150. Within block 122, a multiplying point 152 receives FMLambda and the stoichiometric air to fuel ratio (A/F) BLambda (=14:6) to determine a desired air to fuel ratio (A/F) FMA/F by multiplying BLambda with FMLambda. A second multiplying point 154 receives FMA/F and fuel quantity (per cycle) Qf to determine a desired air quantity (per cycle) Qac by multiplying FMA/F with Qf. The desired air quantity Qac is received by an EGR gas quantity calculation block 15 in the form of a multiplying point. Multiplying point 156 also receives FMEGR to determine a desired EGR gas quantity (per cycle) Qec.

Desired air quantity Qac is passed to TV and VGT control. TV 16 is controlled by a TV command signal based on desired air quantity Qac and engine speed Ne. VGT 14 is controlled by a VGT command signal based on desired air quantity Qac and engine speed Ne. Desired EGR gas quantity Qec is passed to EGR control. EGR valve 32 is controlled by an EGR command signal based on the desired EGR gas quantity. A TV controller 158 and a VGT controller 160 adjust the TV position and VGT geometry to achieve modified desired value FMLambda of excess air ratio. An EGR controller 162 adjusts the EGR valve position to achieve modified desired value FMEGR of EGR rate.

In the illustrated embodiment, the TV, VGT and EGR command signals are represented as duty, and called TVO_Duty, VGT_Duty and EGR_Duty, respectively. In controlling TV 16, an area provided by TV 16 is established by a look-up map 164 for desired air quantity Qac and engine speed Ne. The established area is converted into duty (TVO_Duty) at a look-up table 166. TV controller 158 provides the TVO_Duty to TV 16. In controlling VGT 14, a VGT geometry (nozzle position in the embodiment) is adjusted. An area provided by VGT 14 is established by a look-up map 168 for desired air quantity Qac and engine speed Ne. The established area is converted into duty (VGT_Duty) at a look-up table 170. VGT controller 160 provides the VGT_Duty to VGT 14. In controlling EGR valve 32, an area provided by EGR valve 32 is established by a look-up map 172 for desired EGR gas quantity Qec and engine speed Ne. The established area is converted into duty (EGR_Duty) at a look-up table 174. EGR controller 162 provides the EGR_Duty to EGR valve 32.

Figure 3:
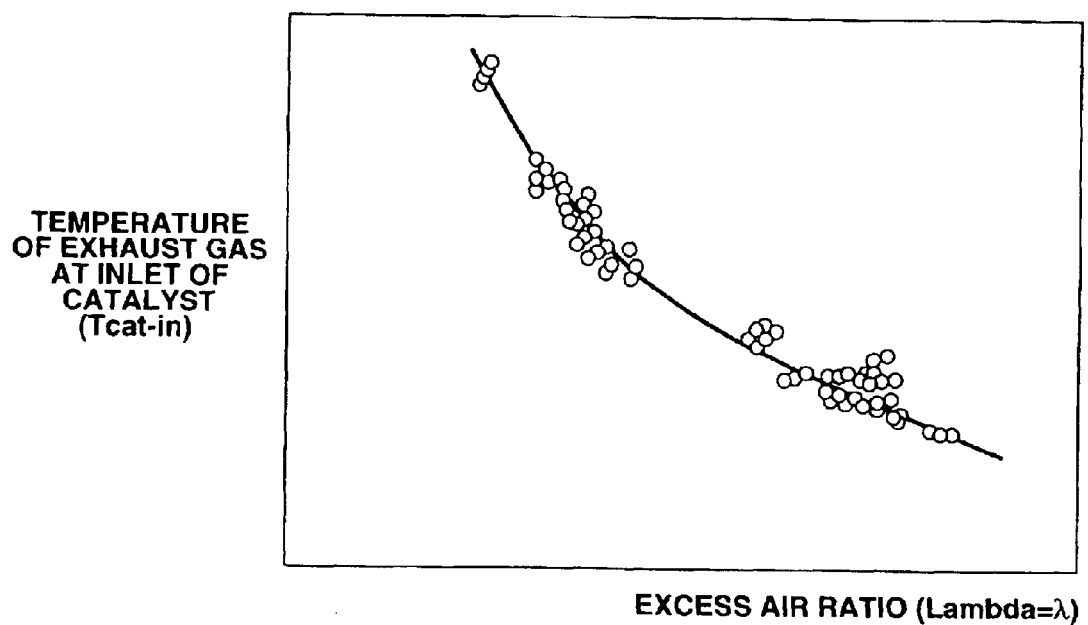
FIG. 3 is a graph of temperature of exhaust gas at inlet of catalyst of an exhaust gas treatment device versus excess air ratio.

With reference to FIG. 3, a number of small circles indicate experimental data. The illustrated curve indicates that reducing excess air ratio (Lambda=λ) elevates temperature of exhaust gas at inlet of catalyst (Tcat-in). This close relationship remains unaltered for various engine conditions over the whole vehicle drive segments. Given a desired value of the exhaust gas temperature Tcat-in, which is requested for heating the catalyst upon and after cold start, a desired value of excess air ratio is determined. Achieving the desired value of excess air ratio results in providing the temperature of exhaust gases as high as the desired temperature value.

Figure 4:
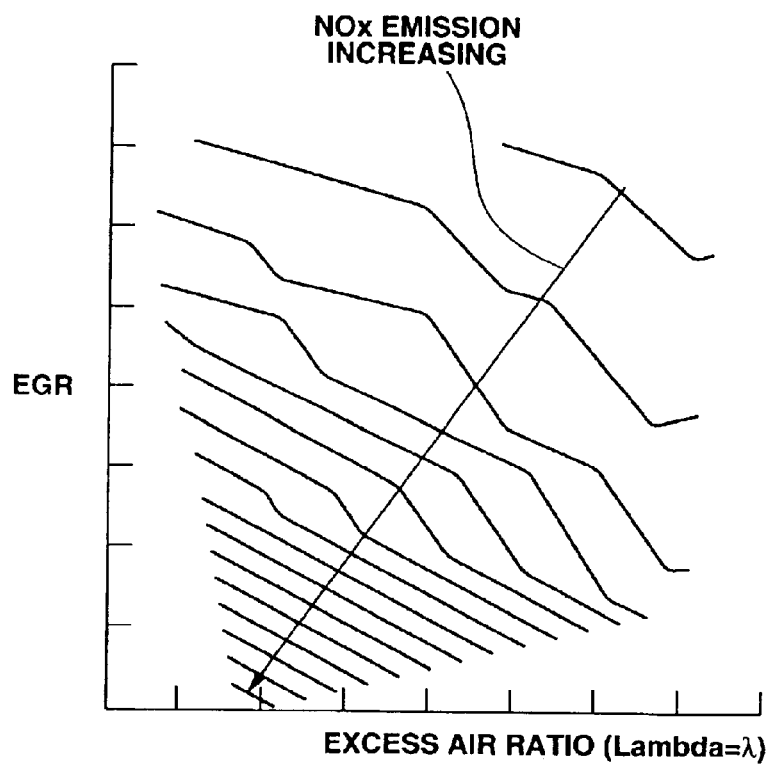
FIG. 4 is a graph of NOx emissions versus EGR and excess air ratio.
Figure 5:
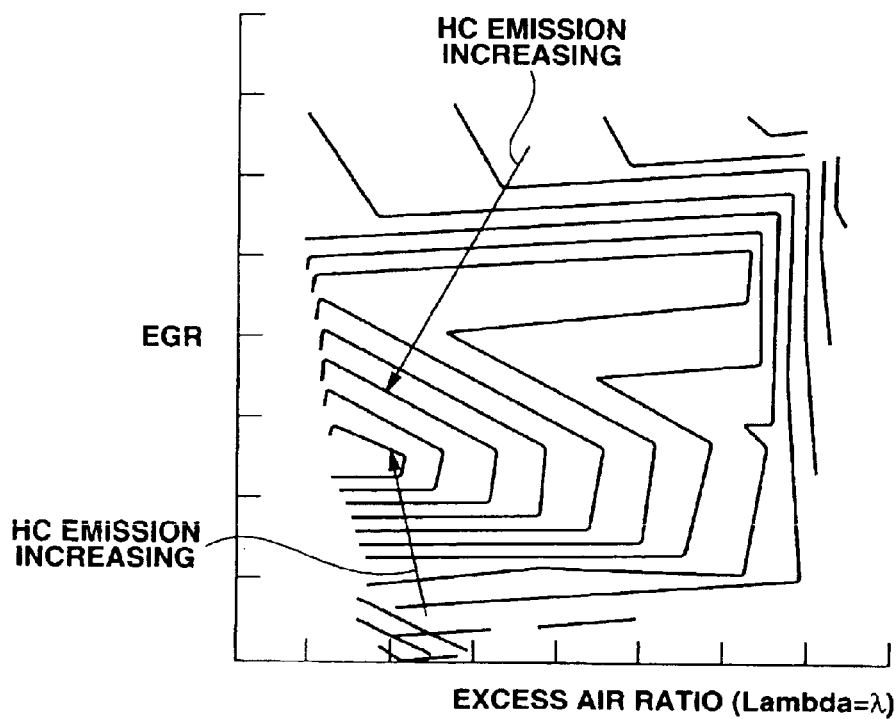
FIG. 5 is a graph of HC emissions versus EGR and excess air ratio.

With reference to FIGS. 4 and 5, the excess air ratio and EGR rate are two important parameters, which determine NOx and HC emissions. From FIG. 4, it will be appreciated that, upon and after cold start, a reduction in excess air ratio to elevate the temperature of exhaust gas for heating the catalyst requires an increase in EGR rate to minimize impact on the engine emission performance. However, initiating such action immediately after cold start might cause a drop in combustion stability due mainly to low cylinder wall temperature (Twall). Engine roughness might result from such drop in combustion stability.

Figure 6:
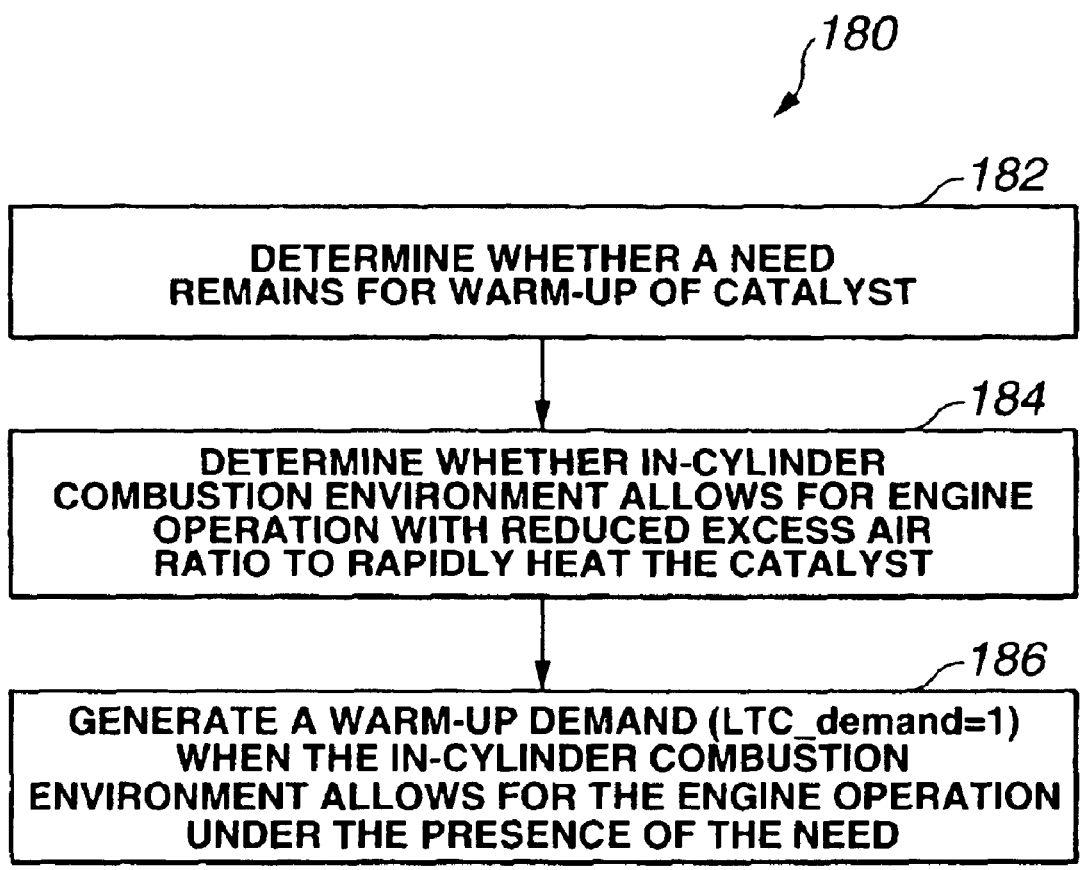
FIG. 6 is a block diagram illustrating logic in an embodiment of the invention.
Figure 30:
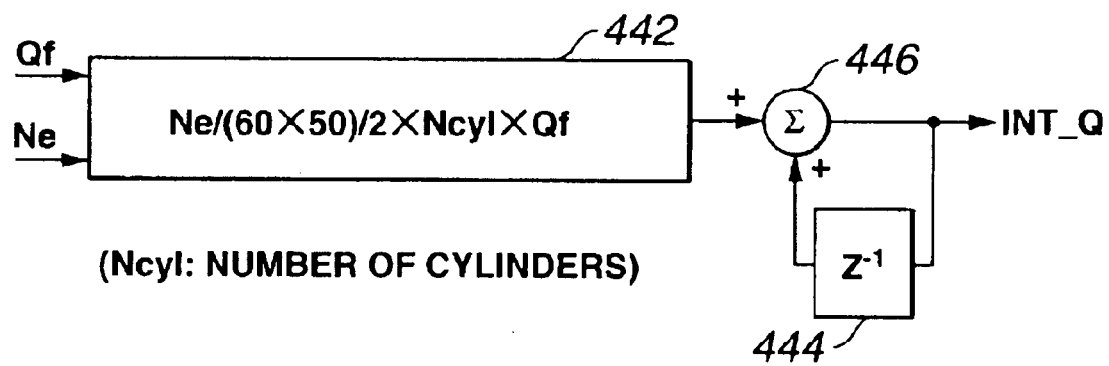
FIG. 30 is a block diagram illustrating a method of integrating the fuel quantity Qf.

In the system of FIG. 2, LTC_demand from control logic for catalyst warm-up 140 functions to avoid such inappropriate in-cylinder environment upon and after cold start. With reference to FIG. 6 and onwards till FIG. 30, the control logic for catalyst warm-up 140 will be described.

With reference now to FIG. 6, logic according to an embodiment of the present invention is generally indicated at 180. At block 182, it is determined whether a need remains for warm-up of catalyst. At block 184, it is determined whether in-cylinder combustion environment allows for engine operation with reduced excess air ratio to rapidly increase the temperature of the catalyst. At block 186, a warm-up demand (LTC_demand=1) is generated when the in-cylinder combustion environment allows for the engine operation under the presence of the need.

There are variations in generating warm-up demand subject to constraint on combustion stability. The whole process may be divided into three segments.

With reference to FIGS. 7A–7D, the first segment is where coolant temperature sensor input Tw or catalyst bed temperature sensor input Tbed is monitored to determine whether warm-up of catalyst is to be initiated. The second segment is where cylinder wall temperature sensor input Twall is monitored to determine whether in-cylinder combustion environment allows for engine operation with reduced excess air ratio to rapidly increase the temperature of the catalyst. In the second segment, a warm-up demand LTC_demand is determined when the in-cylinder combustion environment has grown enough to allow for the engine operation. The third segment is where it is confirmed based on measure or estimate of the catalyst temperature whether there exists the need for the warm-up of catalyst and the determined LTC_demand is generated as it is.

Figure 7A:
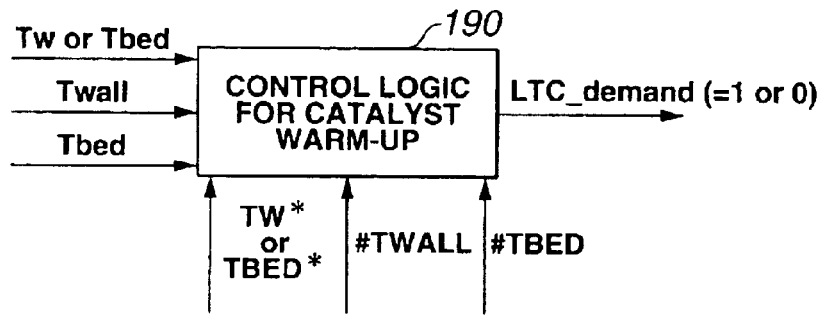
FIGS. 7A–7D are block diagrams illustrating four variations of control logic using cylinder wall temperature in determining whether the engine can allow warm-up of the exhaust gas treatment device.

With reference now to FIG. 7A, at block 190, a coolant temperature threshold TW* is established and a coolant temperature sensor input Tw is compared to threshold TW*. It is determined that warm-up of catalyst is to be initiated when coolant temperature Tw is lower than threshold TW*. Alternatively, a catalyst bed temperature threshold TBED* is established, a catalyst bed temperature sensor input Tbed is compared to threshold TBED*, and it is determined that warm-up of catalyst is to be initiated when catalyst bed temperature Tbed is lower than threshold TBED*. Further, within block 190, a cylinder wall temperature threshold #TWALL is established and a cylinder wall temperature sensor input Twall is compared to threshold #TWALL. It is determined that in-cylinder combustion environment allows for engine operation with reduced excess air ratio to rapidly increase the temperature of the catalyst and warm-up demand LTC_demand is set equal to 1 when cylinder wall temperature Twall exceeds threshold #TWALL. In order to determine whether catalyst has been warmed up, a catalyst bed temperature threshold #TBED that is higher than TBED* is established. Catalyst bed temperature Tbed is compared to threshold #TBED. The determined warm-up demand LTC_demand is generated as it is when catalyst bed temperature Tbed is lower than threshold #TBED. When catalyst bed temperature Tbed achieves or exceeds threshold #TBED, the determined LTC_demand is reset (LTC_demand=0). It will now be appreciated that logic block 190 generates warm-up demand LTC_demand subject to constraint on combustion stability accounting for result of comparing cylinder wall temperature Twall to threshold #TWALL.

Figure 7B:
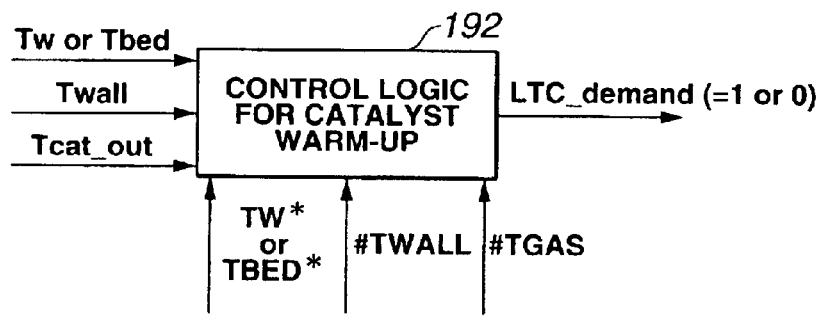

With reference now to FIG. 7B, a block 192 is substantially the same as block 190 in the first and second segments of the whole process. A difference resides in the third segment. In order to determine whether catalyst has been warmed up, as different from comparing catalyst bed temperature Tbed to threshold #TBED, block 192 compares exhaust gas temperature at catalyst outlet Tcat-out to an exhaust gas temperature threshold #TGAS. At block 192, the determined warm-up demand LTC_demand is generated as it is when catalyst outlet exhaust gas temperature Tcat-out is lower than threshold #TGAS. When exhaust gas temperature Tcat-out achieves or exceeds threshold #TGAS, the determined LTC_demand is reset (LTC_demand=0).

Figure 7C:
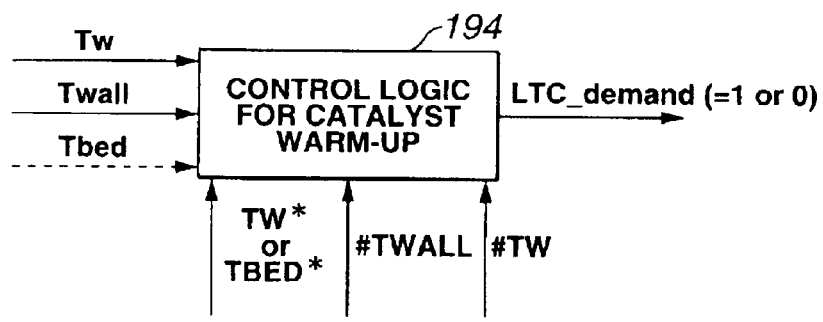

With reference now to FIG. 7C, a block 194 is substantially the same as block 190 in the first and second segments of the whole process. A difference resides in the third segment. In order to determine whether catalyst has been warmed up, as different from block 190 of FIG. 7A, block 194 compares coolant temperature Tw to a coolant temperature threshold #TW. Threshold #TW is higher than threshold TW*. At block 194, the determined warm-up demand LTC_demand is generated as it is when coolant temperature Tw is lower than threshold #TW. When coolant temperature Tw achieves or exceeds threshold #TW, the determined LTC_demand is reset (LTC_demand=0).

Figure 7D:
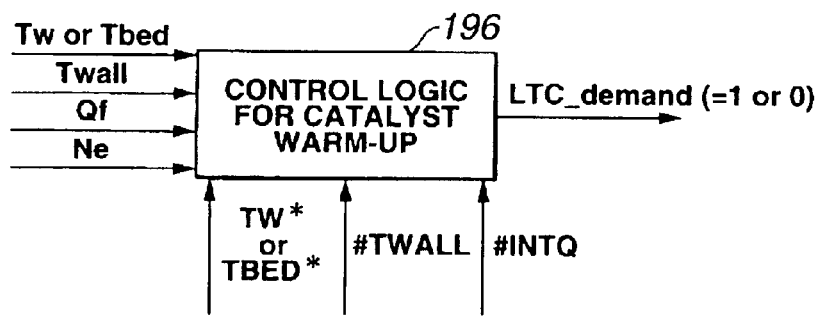

With reference to FIG. 7D, a block 196 is substantially the same as block 190 in the first and second segments of the whole process. A difference resides in the third segment. In order to determine whether catalyst has been warmed up, as different from block 190 of FIG. 7A, block 196 receives fuel quantity Qf and engine speed Ne to calculate an integral of thermal energy INT_Q from the beginning of cold start, and compares integral INT_Q to a time integral threshold #INTQ. At block 196, the determined warm-up demand LTC_demand is generated as it is when integral INT_Q is less than threshold #INTQ. When integral INT_Q is equal to or greater than threshold #INTQ, the determined LTC_demand is reset (LTC_demand=0). Integral of thermal energy INT_Q may be expressed as:

$$INT\_Q = \int Ne/(60 \times 50)/2 \times Ncyl \times Qf \qquad \text{Eq. 1}$$

where: Ncyl is the number of cylinders.

With reference to FIGS. 8A–8D, the first segment is where coolant temperature sensor input Tw or catalyst bed temperature sensor input Tbed is monitored to determine whether warm-up of catalyst is to be initiated. The second segment is where, instead of monitoring cylinder wall temperature Twall, time after the engine having achieved self-sustained operation is measured to determine whether in-cylinder combustion environment allows for engine operation with reduced excess air ratio to rapidly increase the temperature of the catalyst. In the second segment, a warm-up demand LTC_demand is determined. The third segment is where it is confirmed based on measure or estimate of the catalyst temperature whether there exists the need for the warm-up of catalyst and the determined LTC_demand is generated as it is.

Figure 8A:
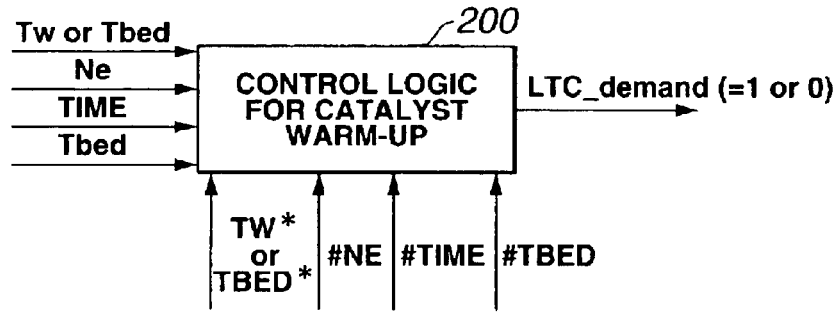
FIGS. 8A–8D are block diagrams illustrating another four variations of control logic using time after the engine has achieved self-sustained operation in determining whether the engine can allow warm-up of the exhaust gas treatment device.
Figure 8B:
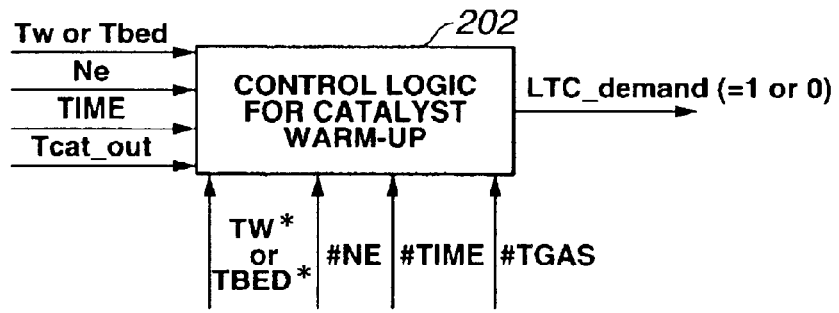
Figure 8C:
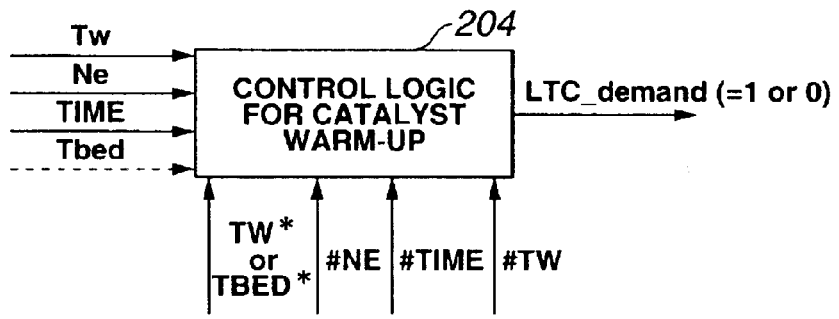
Figure 8D:
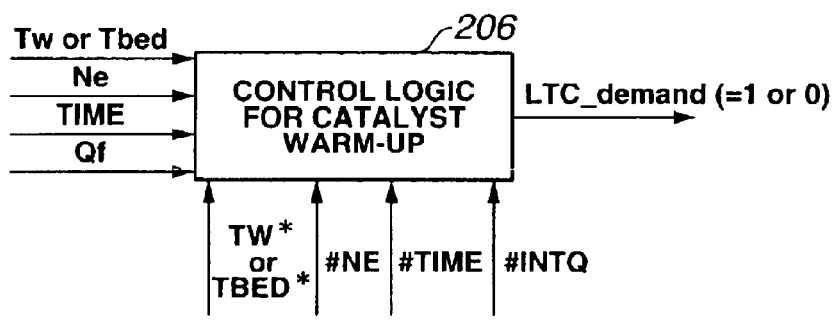

As the discussion proceeds, it will be appreciated that control logic block 200 shown in FIG. 8A is different from block 190 shown in FIG. 7A only in the second segment of the whole process. Likewise, control logic block 202 shown in FIG. 8B is different from block 192 shown in FIG. 7B only in the second segment of the whole process. Further, control logic block 204 shown in FIG. 8C is different from block 194 shown in FIG. 194 shown in FIG. 7C. Lastly, control logic block 206 shown in FIG. 8D is different from block 196 shown in FIG. 7D.

With reference now to FIG. 8A, at block 200, a coolant temperature threshold TW* is established and a coolant temperature sensor input Tw is compared to threshold TW*. It is determined that warm-up of catalyst is to be initiated when coolant temperature Tw is lower than threshold TW*. Alternatively, a catalyst bed temperature threshold TBED* is established, a catalyst bed temperature sensor input Tbed is compared to threshold TBED*, and it is determined that warm-up of catalyst is to be initiated when catalyst bed temperature Tbed is lower than threshold TBED*. Further, within block 200, an engine speed threshold #NE is established and an engine speed input Ne is compared to threshold #NE. It is determined that the engine has achieved self-sustaining operation when engine speed Ne exceeds threshold #NE. Upon or immediately after engine has achieved self-sustaining operation, a timer is started. Block 200 receives a timer count input TIME. A time threshold #TIME is established. Timer count TIME is compared to threshold #TIME. It is determined that in-cylinder combustion environment allows for engine operation with reduced excess air ratio to rapidly increase the temperature of the catalyst. A warm-up demand LTC_demand is set equal to 1 when timer count TIME exceeds threshold #TIME. In order to determine whether catalyst has been warmed up, a catalyst bed temperature threshold #TBED that is higher than TBED* is established. Catalyst bed temperature Tbed is compared to threshold #TBED. The determined warm-up demand LTC_demand is generated as it is when catalyst bed temperature Tbed is lower than threshold #TBED. When catalyst bed temperature Tbed achieves or exceeds threshold #TBED, the determined LTC_demand is reset (LTC_demand=0). It will now be appreciated that logic block 200 generates warm-up demand LTC_demand subject to constraint on combustion stability accounting for result of comparing timer count TIME to threshold #TIME.

With reference now to FIG. 8B, block 202 is substantially the same as block 200 in the first and second segments of the whole process. A difference resides in the third segment. In order to determine whether catalyst has been warmed up, as different from comparing catalyst bed temperature Tbed to threshold #TBED, block 202 compares exhaust gas temperature at catalyst outlet Tcat-out to an exhaust gas temperature threshold #TGAS. At block 202, the determined warm-up demand LTC_demand is generated as it is when catalyst outlet exhaust gas temperature Tcat-out is lower than threshold #TGAS. When exhaust gas temperature Tcat-out achieves or exceeds threshold #TGAS, the determined LTC_demand is reset (LTC_demand=0).

With reference now to FIG. 8C, block 204 is substantially the same as block 200 in the first and second segments of the whole process. A difference resides in the third segment. In order to determine whether catalyst has been warmed up, as different from block 200 of FIG. 8A, block 204 compares coolant temperature Tw to a coolant temperature threshold #TW. Threshold #TW is higher than threshold TW*. At block 204, the determined warm-up demand LTC_demand is generated as it is when coolant temperature Tw is lower than threshold #TW. When coolant temperature Tw achieves or exceeds threshold #TW, the determined LTC_demand is reset (LTC_demand=0).

With reference to FIG. 8D, a block 206 is substantially the same as block 200 in the first and second segments of the whole process. A difference resides in the third segment. In order to determine whether catalyst has been warmed up, as different from block 200 of FIG. 8A, block 206 receives fuel quantity Qf and engine speed Ne to calculate an integral of thermal energy INT_Q, as expressed by Eq. 1, from the beginning of cold start, and compares integral INT_Q to a time integral threshold #INTQ. At block 206, the determined warm-up demand LTC_demand is generated as it is when integral INT_Q is less than threshold #INTQ. When integral INT_Q is equal to or greater than threshold #INTQ, the determined LTC_demand is reset (LTC_demand=0).

With reference to FIGS. 9A–9D, the first segment is where coolant temperature sensor input Tw or catalyst bed temperature sensor input Tbed is monitored to determine whether warm-up of catalyst is to be initiated. The second segment is where, instead of monitoring cylinder wall temperature Twall, idle fuel quantity Qfidle is monitored upon and after cold start to determine whether in-cylinder combustion environment allows for engine operation with reduced excess air ratio to rapidly increase the temperature of the catalyst. A warm-up demand LTC_demand is determined. The third segment is where it is confirmed based on measure or estimate of the catalyst temperature whether there exists the need for the warm-up of catalyst and the determined LTC_demand is generated as it is.

Figure 9A:
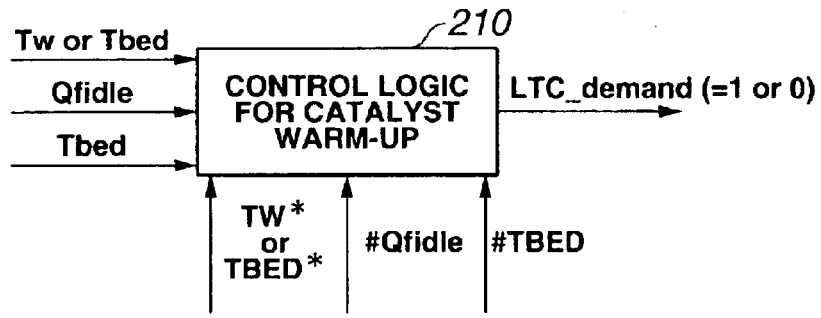
FIGS. 9A–9D are block diagrams illustrating other four variations of control logic using fuel quantity at idle in determining whether the engine can allow warm-up of the exhaust gas treatment device.
Figure 9B:
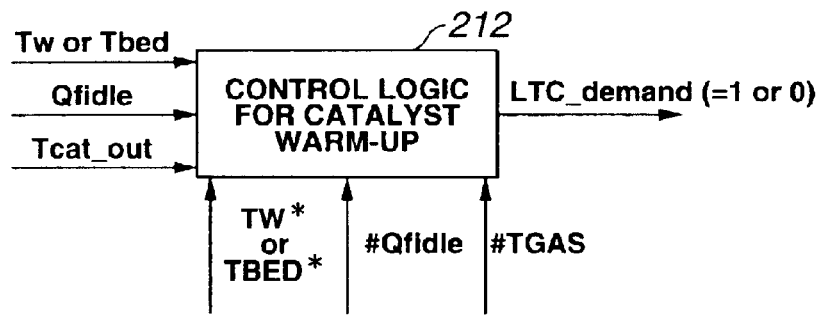
Figure 9C:
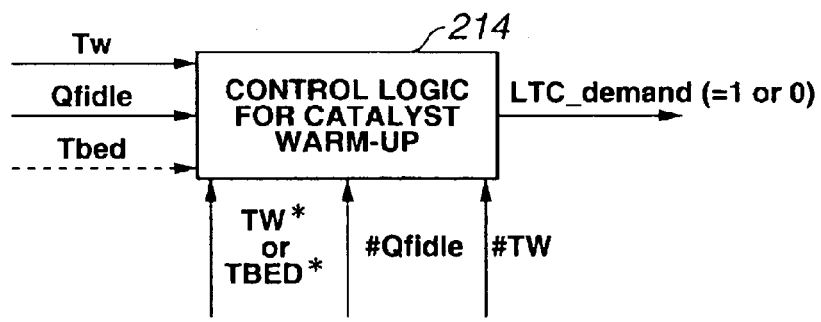
Figure 9D:
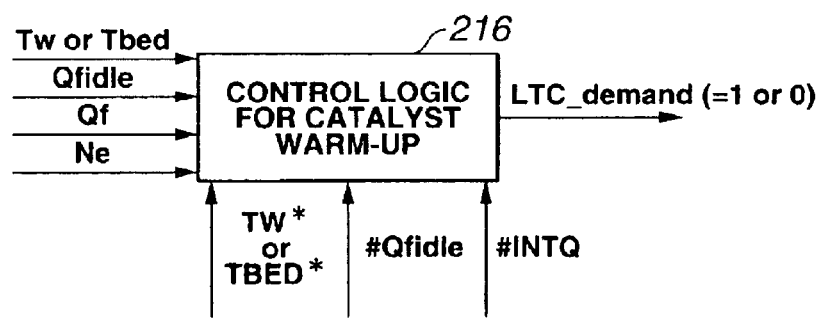

As the discussion proceeds, it will be appreciated that control logic block 210 shown in FIG. 9A is different from block 190 shown in FIG. 7A only in the second segment of the whole process. Likewise, control logic block 212 shown in FIG. 9B is different from block 192 shown in FIG. 7B only in the second segment of the whole process. Further, control logic block 214 shown in FIG. 9C is different from block 194 shown in FIG. 194 shown in FIG. 7C. Lastly, control logic block 216 shown in FIG. 9D is different from block 196 shown in FIG. 7D.

With reference now to FIG. 9A, at block 210, a coolant temperature threshold TW* is established and a coolant temperature sensor input Tw is compared to threshold TW*. It is determined that warm-up of catalyst is to be initiated when coolant temperature Tw is lower than threshold TW*, Alternatively, a catalyst bed temperature threshold TBED* is established, a catalyst bed temperature sensor input Tbed is compared to threshold TBED*, and it is determined that warm-up of catalyst is to be initiated when catalyst bed temperature Tbed is lower than threshold TBED*. Further, within block 210, an idle fuel quantity threshold #Qfidle is established and an idle fuel quantity Qfidle is compared to threshold #Qfidle. It is determined that in-cylinder combustion environment allows for engine operation with reduced excess air ratio to increase the temperature of the catalyst. A warm-up demand LTC_demand is set equal to 1 when idle fuel quantity Qfidle drops below threshold #Qfidle. In order to determine whether catalyst has been warmed up, a catalyst bed temperature threshold #TBED that is higher than TBED* is established. Catalyst bed temperature Tbed is compared to threshold #TBED. The determined warm-up demand LTC_demand is generated as it is when catalyst bed temperature Tbed is lower than threshold #TBED. When catalyst bed temperature Tbed achieves or exceeds threshold #TBED, the determined LTC_demand is reset (LTC_demand=0). It will now be appreciated that logic block 200 generates warm-up demand LTC_demand subject to constraint on combustion stability accounting for result of comparing idle fuel quantity Qfidle to threshold #Qfidle.

With reference now to FIG. 9B, block 212 is substantially the same as block 210 in the first and second segments of the whole process. A difference resides in the third segment. In order to determine whether catalyst has been warmed up, as different from comparing catalyst bed temperature Tbed to threshold #TBED, block 212 compares exhaust gas temperature at catalyst outlet Tcat-out to an exhaust gas temperature threshold #TGAS. At block 212, the determined warm-up demand LTC_demand is generated as it is when catalyst outlet exhaust gas temperature Tcat-out is lower than threshold #TGAS. When exhaust gas temperature Tcat-out achieves or exceeds threshold #TGAS, the determined LTC_demand is reset (LTC_demand=0).

With reference now to FIG. 9C, block 214 is substantially the same as block 210 in the first and second segments of the whole process. A difference resides in the third segment. In order to determine whether catalyst has been warmed up, as different from block 210 of FIG. 9A, block 214 compares coolant temperature Tw to a coolant temperature threshold #TW. Threshold #TW is higher than threshold TW*. At block 214, the determined warm-up demand LTC_demand is generated as it is when coolant temperature Tw is lower than threshold #TW. When coolant temperature Tw achieves or exceeds threshold #TW, the determined LTC_demand is reset (LTC_demand=0).

With reference to FIG. 9D, a block 216 is substantially the same as block 210 in the first and second segments of the whole process. A difference resides in the third segment. In order to determine whether catalyst has been warmed up, as different from block 210 of FIG. 9A, block 216 receives fuel quantity Qf and engine speed Ne to calculate an integral of thermal energy INT_Q, as expressed by Eq. 1, from the beginning of cold start, and compares integral INT_Q to a time integral threshold #INTQ. At block 206, the determined warm-up demand LTC_demand is generated as it is when integral INT_Q is less than threshold #INTQ. When integral INT_Q is equal to or greater than threshold #INTQ, the determined LTC_demand is reset (LTC_demand=0).

Figure 10:
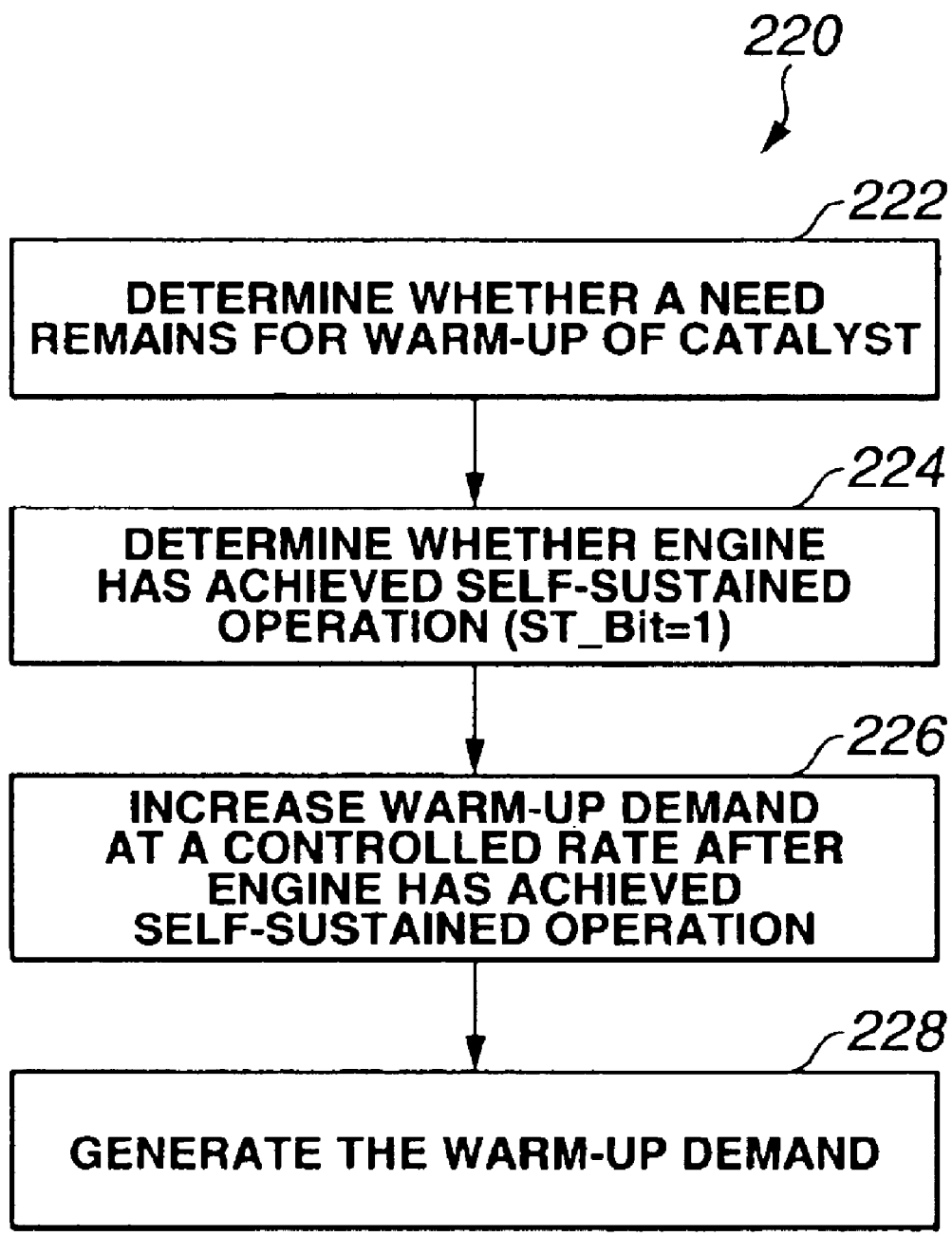
FIG. 10 is a block diagram illustrating another logic in an embodiment of the invention.

With reference now to FIG. 10, logic according to another embodiment of the present invention is generally indicated at 220. At block 222, it is determined whether a need remains for warm-up of catalyst. At block 224, it is determined whether engine has achieved self-sustained operation during cold start. At block 226, a warm-up demand, LTC_demand, is increased at a controlled rate immediately after engine has achieved self-sustained operation. At block 228, the warm-up demand is generated under the presence of the need.

In most cases during cold start, cylinder wall temperature Twall stays below threshold #Twall immediately after engine has achieved self-sustained operation, providing in-cylinder combustion environment not growing enough to allow for engine operation with reduced excess air ratio to rapidly increase the temperature of the catalyst. In this embodiment, in order to reduce warm-up time of the catalyst, a so-called ramp control is employed. According to the ram control, the warm-up demand LTC_demand is increased toward 1 at a controlled rate accounting for the progress of in-cylinder combustion environment.

There are variations in generating warm-up demand subject to constraint on combustion stability. The whole process may be divided into three segments.

With reference to FIGS. 11A–11D, the first segment is where coolant temperature sensor input Tw or catalyst bed temperature sensor input Tbed is monitored to determine whether warm-up of catalyst is to be initiated. The second segment is where a ramp control is carried out to increase a warm-up demand LTC_demand immediately after the engine having achieved self-sustained operation at a controlled rate accounting for the progress of in-cylinder combustion environment. The controlled rate is determined as a function of time. The third segment is where it is confirmed based on measure or estimate of the catalyst temperature whether there exists the need for the warm-up of catalyst and the determined LTC_demand is generated as it is.

Figure 11A:
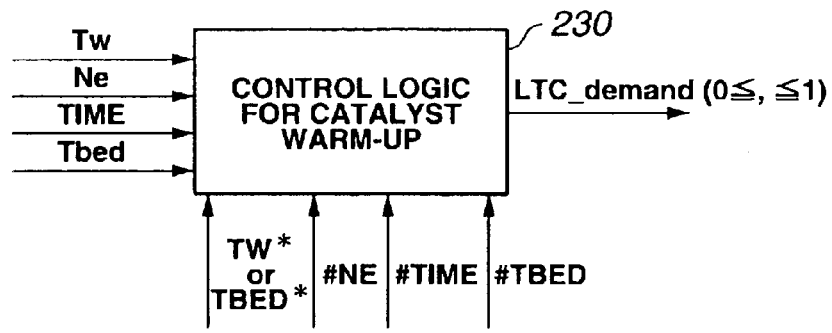
FIGS. 11A–11D are block diagrams illustrating four variations of control logic employing ramp control over coolant temperature dependent time after the engine has achieved self-sustained operation to initiate warm-up of the exhaust gas treatment device at an early stage.
Figure 12:
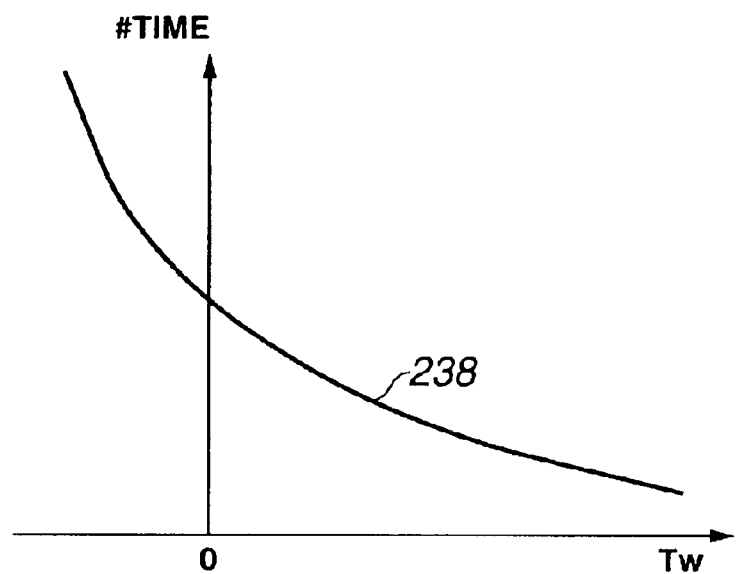
FIG. 12 is a graph depicting time required after engine has achieved self-sustaining operation versus coolant temperature during cold start.

With reference now to FIG. 11A, at block 230, a coolant temperature threshold TW* is established and a coolant temperature sensor input Tw is compared to threshold TW*. It is determined that warm-up of catalyst is to be initiated when coolant temperature Tw is lower than threshold TW*. Alternatively, a catalyst bed temperature threshold TBED* is established, a catalyst bed temperature sensor input Tbed is compared to threshold TBED*, and it is determined that warm-up of catalyst is to be initiated when catalyst bed temperature Tbed is lower than threshold TBED*. Further, within block 230, an engine speed threshold #NE is established and an engine speed input Ne is compared to threshold #NE. It is determined that the engine has achieved self-sustaining operation when engine speed Ne exceeds threshold #NE. Upon or immediately after engine has achieved self-sustaining operation, a timer is started. Block 230 receives a timer count input TIME. A time threshold #TIME is established. The lower coolant temperature Tw at the beginning of cold start, the more it takes time for in-cylinder environment to grow enough to allow engine operation with reduced excess air ratio. This relationship is illustrated in FIG. 12. In FIG. 12, the fully drawn line 238 depicts, as an example, the variation of time threshold #TIME with different values of coolant temperature Tw. Using this, time threshold #TIME is determined as a function of coolant temperature Tw at the beginning of cold start. For the ramp control immediately after engine has achieved self-sustaining operation, warm-up demand LTC_demand is increased toward 1 at a controlled rate of a difference or a ratio between timer count TIME and threshold #TIME. In an embodiment, a deviation dTIME of TIME from #TIME is used. In this case, as shown by the fully drawn curve 240 in FIG. 13, warm-up demand LTC_demand increases from zero to 1 as dTIME decreases from #TIME to zero. In another embodiment, a ratio TRATIO between TIME and #TIME (=TIME/#TIME) is used. In this case, as shown by the fully drawn curcve 242 in FIG. 14, warm-up demand LTC_demand increases from zero to 1 as the ratio TRATIO increases from zero to 1. In order to determine whether catalyst has been warmed up, a catalyst bed temperature threshold #TBED that is higher than TBED* is established. Catalyst bed temperature Tbed is compared to threshold #TBED. The determined warm-up demand LTC_demand is generated as it is when catalyst bed temperature Tbed is lower than threshold #TBED. When catalyst bed temperature Tbed achieves or exceeds threshold #TBED, the determined LTC_demand is reset (LTC_demand=0). It will now be appreciated that logic block 200 generates warm-up demand LTC_demand subject to constraint on combustion stability accounting for result of comparing timer count TIME to threshold #TIME.

Figure 11B:
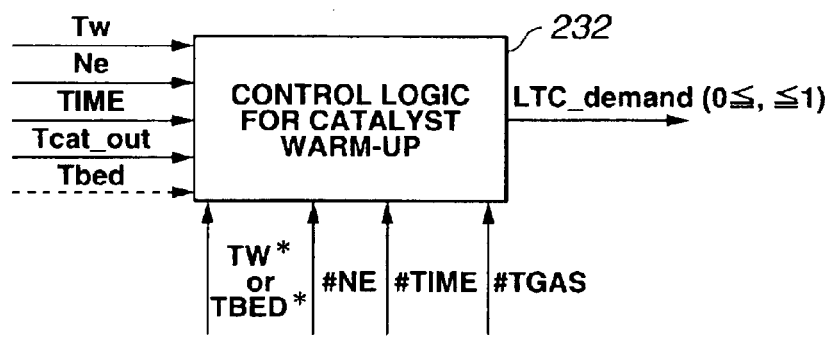

With reference now to FIG. 11B, block 232 is substantially the same as block 230 in the first and second segments of the whole process. A difference resides in the third segment. In order to determine whether catalyst has been warmed up, as different from comparing catalyst bed temperature Tbed to threshold #TBED, block 232 compares exhaust gas temperature at catalyst outlet Tcat-out to an exhaust gas temperature threshold #TGAS. At block 232, the determined warm-up demand LTC_demand is generated as it is when catalyst outlet exhaust gas temperature Tcat-out is lower than threshold #TGAS. When exhaust gas temperature Tcat-out achieves or exceeds threshold #TGAS, the determined LTC_demand is reset (LTC_demand=0).

Figure 11C:
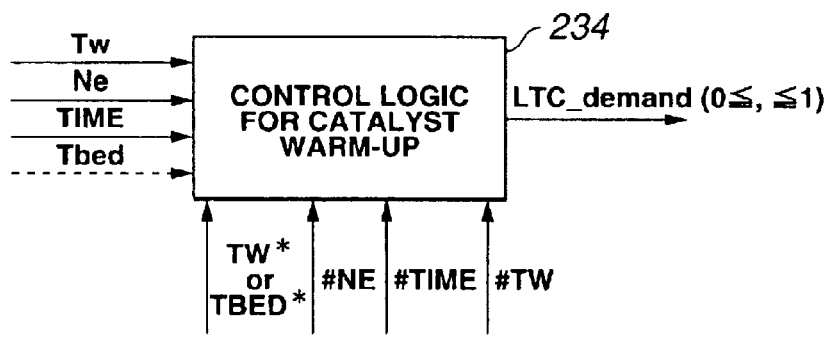

With reference now to FIG. 11C, block 234 is substantially the same as block 230 in the first and second segments of the whole process. A difference resides in the third segment. In order to determine whether catalyst has been warmed up, as different from block 230 of FIG. 11A, block 234 compares coolant temperature Tw to a coolant temperature threshold #TW. Threshold #TW is higher than threshold TW*. At block 234, the determined warm-up demand LTC_demand is generated as it is when coolant temperature Tw is lower than threshold #TW. When coolant temperature Tw achieves or exceeds threshold #TW, the determined LTC_demand is reset (LTC_demand=0).

Figure 11D:
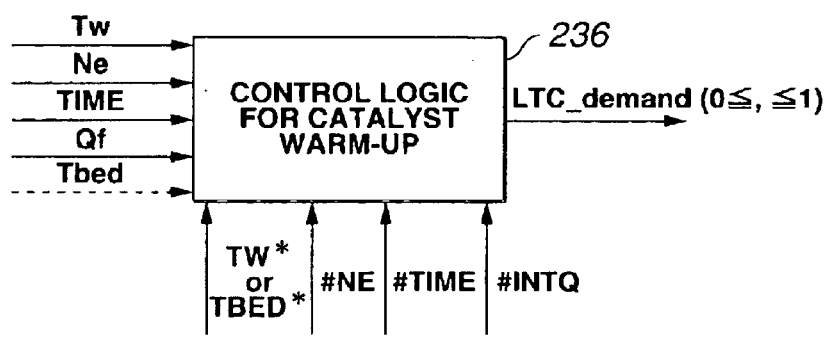

With reference to FIG. 11D, a block 236 is substantially the same as block 230 in the first and second segments of the whole process. A difference resides in the third segment. In order to determine whether catalyst has been warmed up, as different from block 230 of FIG. 11A, block 236 receives fuel quantity Qf and engine speed Ne to calculate an integral of thermal energy INT_Q, as expressed by Eq. 1, from the beginning of cold start, and compares integral INT_Q to a time integral threshold #INTQ. At block 236, the determined warm-up demand LTC_demand is generated as it is when integral INT_Q is less than threshold #INTQ. When integral INT_Q is equal to or greater than threshold #INTQ, the determined LTC_demand is reset (LTC_demand=0).

With reference to FIGS. 15A–15D, the first segment is where coolant temperature sensor input Tw or catalyst bed temperature sensor input Tbed is monitored to determine whether warm-up of catalyst is to be initiated. The second segment is where a ramp control is carried out to increase a warm-up demand LTC_demand immediately after the engine having achieved self-sustained operation at a controlled rate accounting for the progress of in-cylinder combustion environment. The controlled rate is determined as a function of idle fuel quantity (Qfidle). The third segment is where it is confirmed based on measure or estimate of the catalyst temperature whether there exists the need for the warm-up of catalyst and the determined LTC_demand is generated as it is.

Figure 15A:
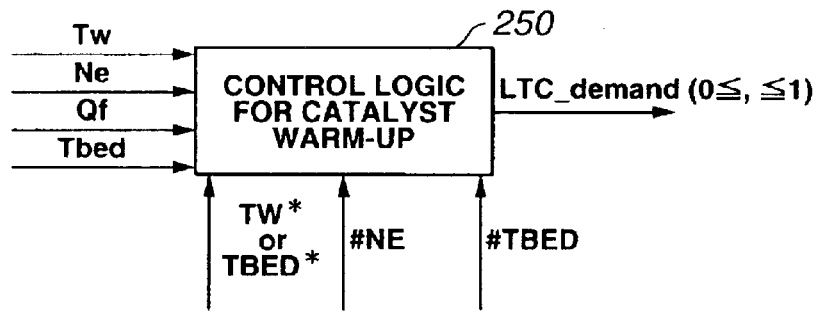
FIGS. 15A–15D are block diagrams of four variations of control logic employing ramp control response to a deviation in fuel quantity after the engine has achieved self-sustained operation to initiate warm-up of the exhaust gas treatment device at an early stage.
Figure 15B:
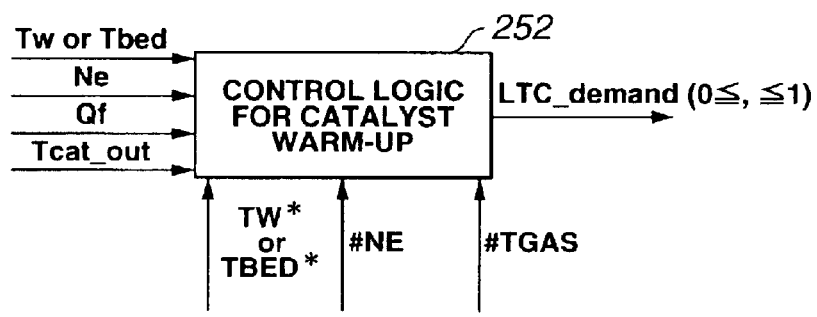
Figure 15C:
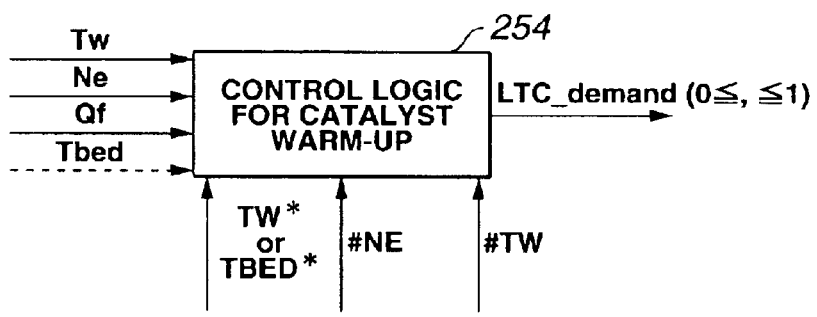
Figure 15D:
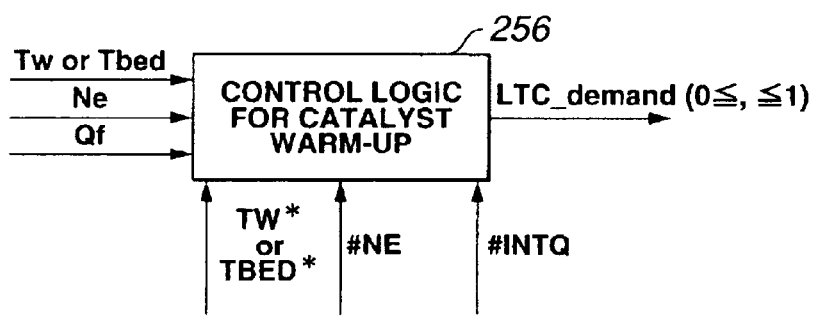

As the discussion proceeds, it will be appreciated that control logic block 250 shown in FIG. 15A is different from block 230 shown in FIG. 11A only in the second segment of the whole process. Likewise, control logic block 252 shown in FIG. 15B is different from block 232 shown in FIG. 11B only in the second segment of the whole process. Further, control logic block 254 shown in FIG. 15C is different from block 234 shown in FIG. 194 shown in FIG. 11C. Lastly, control logic block 256 shown in FIG. 15D is different from block 236 shown in FIG. 11D.

With reference now to FIG. 15A, at block 250, a coolant temperature threshold TW* is established and a coolant temperature sensor input Tw is compared to threshold TW*. It is determined that warm-up of catalyst is to be initiated when coolant temperature Tw is lower than threshold TW*. Alternatively, a catalyst bed temperature threshold TBED* is established, a catalyst bed temperature sensor input Tbed is compared to threshold TBED*, and it is determined that warm-up of catalyst is to be initiated when catalyst bed temperature Tbed is lower than threshold TBED*. Further, within block 250, an engine speed threshold #NE is established and an engine speed input Ne is compared to threshold #NE. It is determined that the engine has achieved self-sustaining operation when engine speed Ne exceeds threshold #NE. Upon or immediately after engine has achieved self-sustaining operation, a timer is started. Block 250 receives an idle fuel quantity input Qfidle. An idle fuel quantity threshold #Qfidle is established. The lower coolant temperature Tw at the beginning of cold start, the more it takes time for idle fuel quantity Qfidle to drops down to threshold Qfilde. The setting is such that combustion environment has grown enough to allow for engine operation with reduced excess air ratio when idle fuel quantity drops down to threshold #Qfidle. For the ramp control immediately after engine has achieved self-sustaining operation, warm-up demand LTC_demand is increased toward 1 at a controlled rate of a difference or a ratio between idle fuel quantity Qfidle and threshold #Qfidle. In an embodiment, a deviation dQfidle of #Qfidle from Qfidle is used. In this case, as shown by the fully drawn curve 258 in FIG. 16, warm-up demand LTC_demand increases from zero to 1 as dQfidle decreases toward zero. In another embodiment, a ratio QRATIO between #Qfilde and Qfidle (=#Qfidle/Qfidle) is used. In this case, as shown by the fully drawn curve 260 in FIG. 17, warm-up demand LTC_demand increases toward 1 as the ratio QRATIO increases toward 1. In order to determine whether catalyst has been warmed up, a catalyst bed temperature threshold #TBED that is higher than TBED* is established. Catalyst bed temperature Tbed is compared to threshold #TBED. The determined warm-up demand LTC_demand is generated as it is when catalyst bed temperature Tbed is lower than threshold #TBED, When catalyst bed temperature Tbed achieves or exceeds threshold #TBED, the determined LTC_demand is reset (LTC_demand=0). It will now be appreciated that logic block 200 generates warm-up demand LTC_demand subject to constraint on combustion stability accounting for result of comparing idle fuel quantity Qfidle to threshold #Qfidle.

With reference now to FIG. 15B, block 252 is substantially the same as block 250 in the first and second segments of the whole process. A difference resides in the third segment. In order to determine whether catalyst has been warmed up, as different from comparing catalyst bed temperature Tbed to threshold #TBED, block 252 compares exhaust gas temperature at catalyst outlet Tcat-out to an exhaust gas temperature threshold #TGAS. At block 252, the determined warm-up demand LTC_demand is generated as it is when catalyst outlet exhaust gas temperature Tcat-out is lower than threshold #TGAS. When exhaust gas temperature Tcat-out achieves or exceeds threshold #TGAS, the determined LTC_demand is reset (LTC_demand=0).

With reference now to FIG. 15C, block 254 is substantially the same as block 250 in the first and second segments of the whole process. A difference resides in the third segment. In order to determine whether catalyst has been warmed up, as different from block 250 of FIG. 15A, block 254 compares coolant temperature Tw to a coolant temperature threshold #TW. Threshold #TW is higher than threshold TW*. At block 254, the determined warm-up demand LTC_demand is generated as it is when coolant temperature Tw is lower than threshold #TW. When coolant temperature Tw achieves or exceeds threshold #TW, the determined LTC_demand is reset (LTC_demand=0).

With reference to FIG. 15D, a block 256 is substantially the same as block 250 in the first and second segments of the whole process. A difference resides in the third segment. In order to determine whether catalyst has been warmed up, as different from block 250 of FIG. 15A, block 256 receives fuel quantity Qf and engine speed Ne to calculate an integral of thermal energy INT_Q, as expressed by Eq. 1, from the beginning of cold start, and compares integral INT_Q to a time integral threshold #INTQ. At block 256, the determined warm-up demand LTC_demand is generated as it is when integral INT_Q is less than threshold #INTQ. When integral INT_Q is equal to or greater than threshold #INTQ, the determined LTC_demand is reset (LTC_demand=0).

Figure 19:
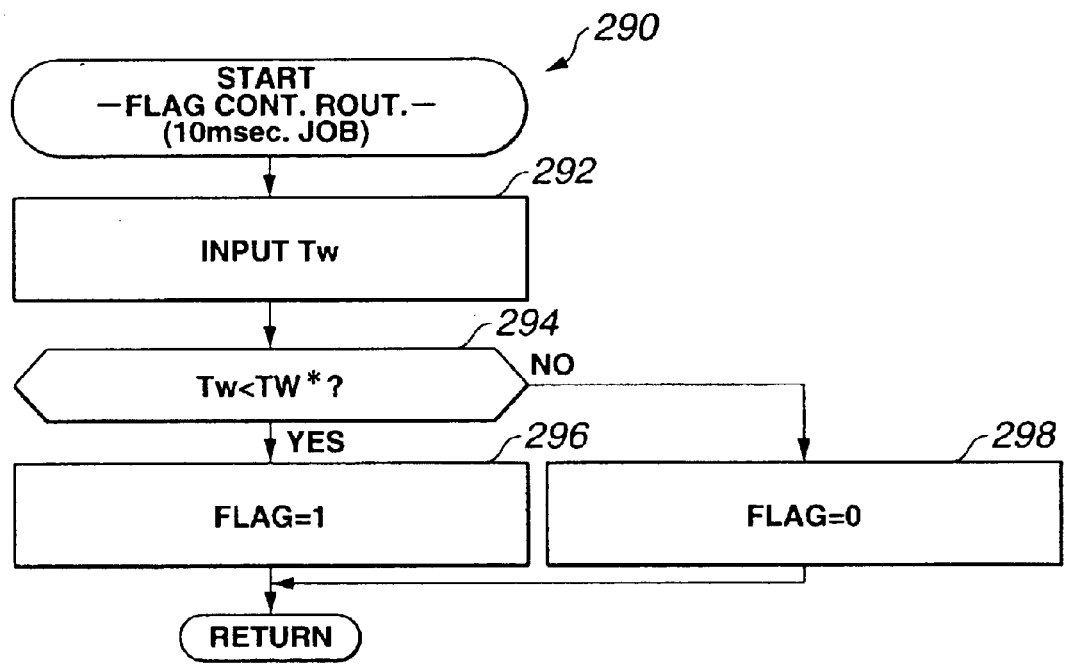
FIG. 19 is a flow diagram illustrating one example of a flag control routine of the invention.
Figure 20:
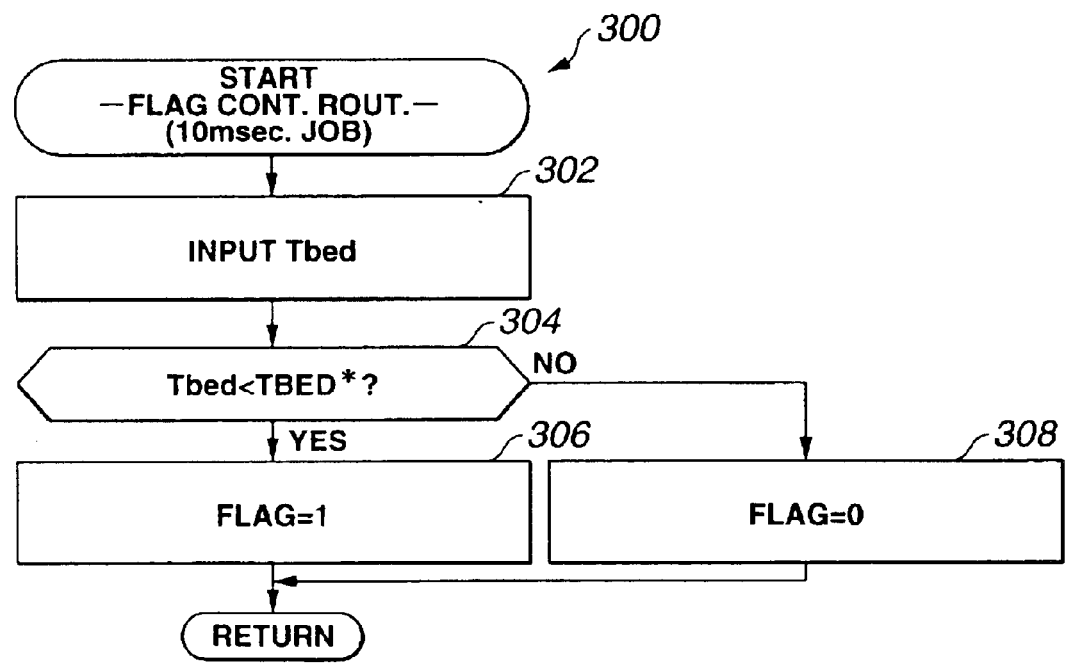
FIG. 20 is a flow diagram illustrating another example of a flag control routine of the invention.

With reference again to FIGS. 7A to 7D, blocks 190, 192, 194 and 196 may contain any one of flag control routines shown in FIGS. 19 and 20 as the first segment of the whole process, an LTC_demand calculation routine shown in FIG. 21 as the second segment, and any one of LTC_demand confirmation routines shown in FIGS. 26 to 29 as the third segment.

With reference again to FIGS. 8A to 8D, blocks 200, 202, 204 and 206 may contain any one of flag control routines shown in FIGS. 19 and 20 as the first segment of the whole process, an LTC_demand calculation routine shown in FIG. 22 as the second segment, and any one of LTC_demand confirmation routines shown in FIGS. 26 to 29 as the third segment.

Figure 24:
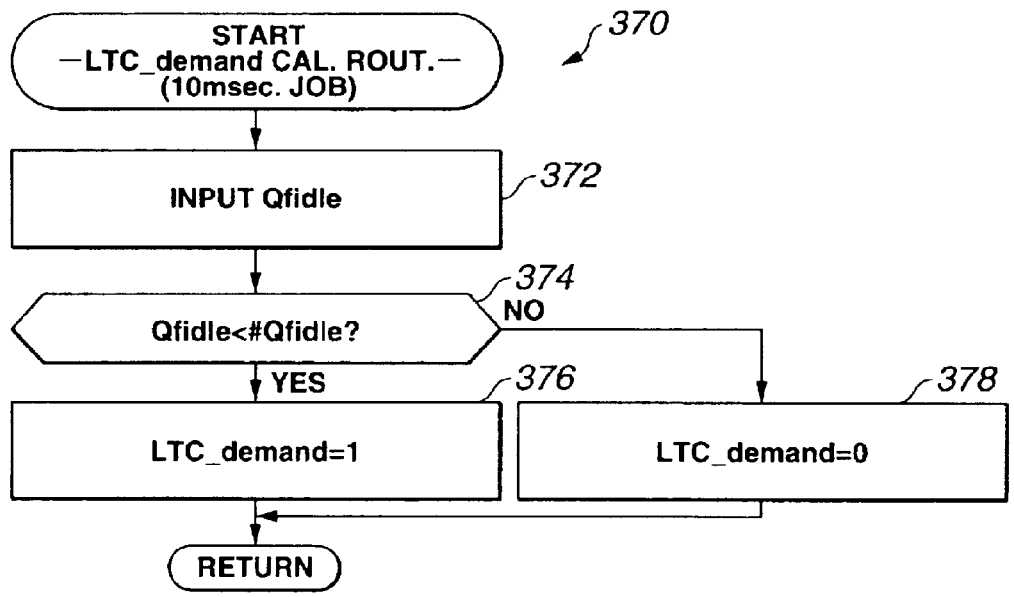
FIG. 24 is a flow diagram of further example of an LTC_demand calculation routine of the invention.

With reference again to FIGS. 9A to 9D, blocks 210, 212, 214 and 216 may contain any one of flag control routines shown FIGS. 19 and 20 as the first segment of the whole process, an LTC_demand calculation routine shown in FIG. 24 as the second segment, and any one of LTC_demand confirmation routines shown in FIGS. 26 to 29 as the third segment.

Figure 23:
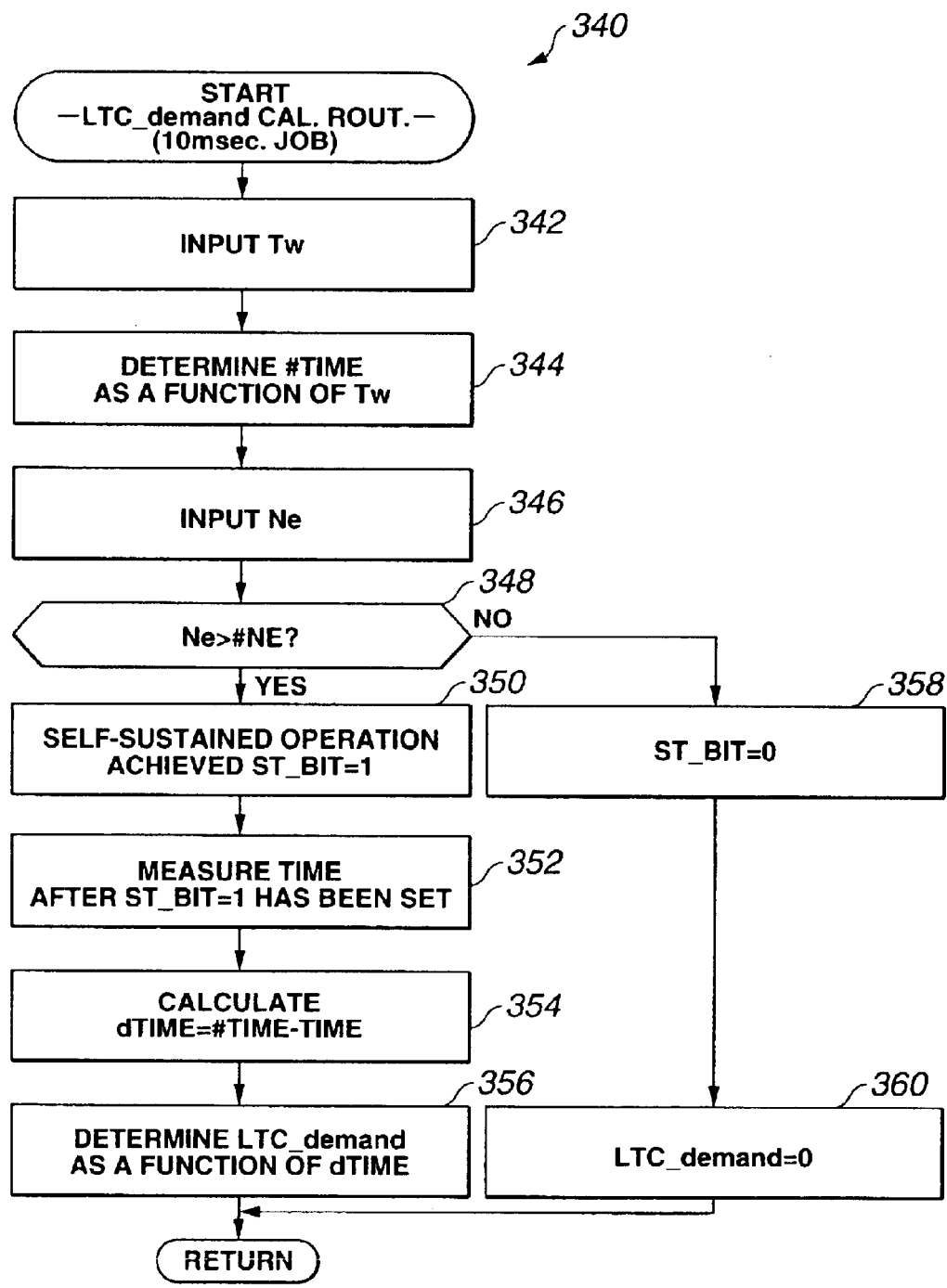
FIG. 23 is a flow diagram of still another example of an LTC_demand calculation routine of the invention.

With reference again to FIGS. 11A to 11D, blocks 230, 232, 234 and 236 may contain any one of flag control routines shown in FIGS. 19 and 20 as the first segment of the whole process, an LTC_demand calculation routine shown in FIG. 23 as the second segment, and any one of LTC_demand confirmation routines shown in FIGS. 26 to 29 as the third segment.

Figure 25:
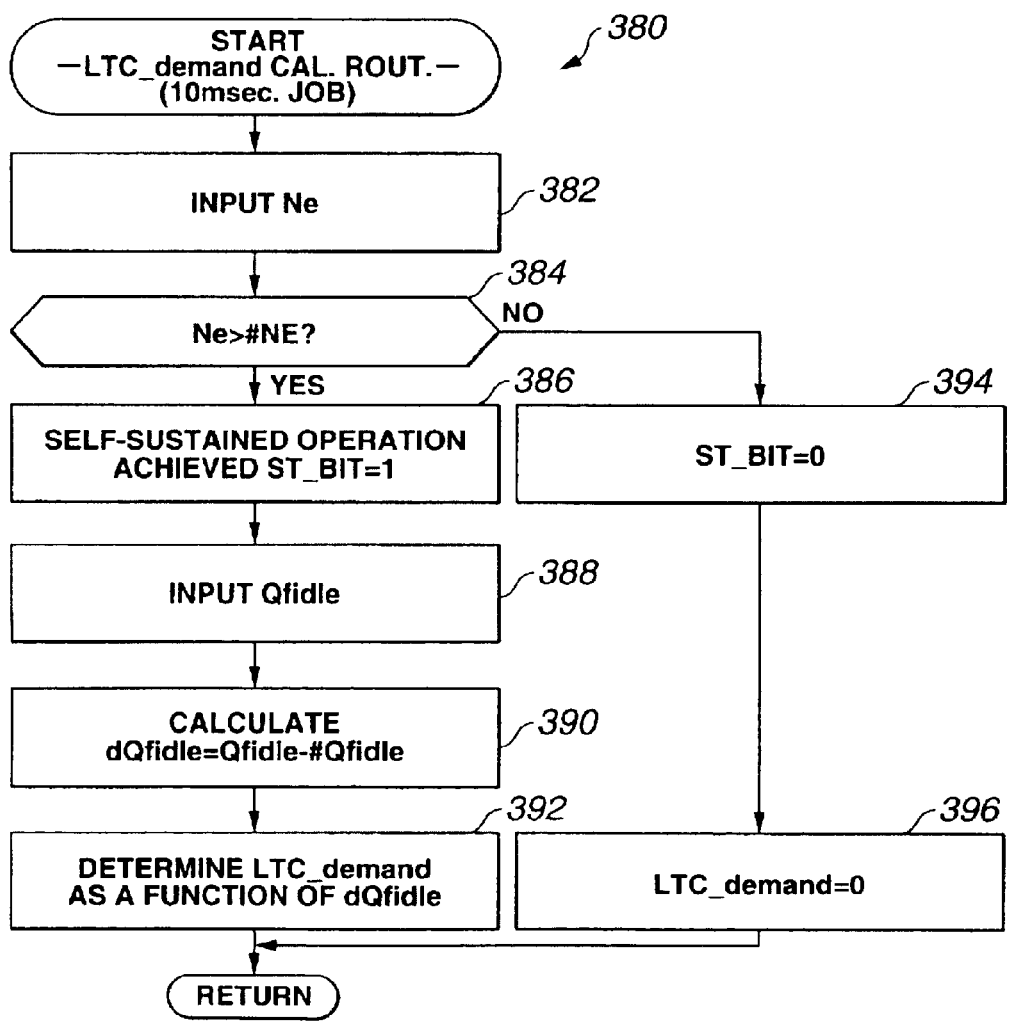
FIG. 25 is a flow diagram of other example of an LTC_demand calculation routine of the invention.

With reference again to FIGS. 15A to 15D, blocks 250, 252, 254 and 256 may contain any one of flag control routines shown in FIGS. 19 and 20 as the first segment of the whole process, an LTC_demand calculation routine shown in FIG. 25 as the second segment, and any one of LTC_demand confirmation routines shown in FIGS. 26 to 29 as the third segment.

Figure 18:
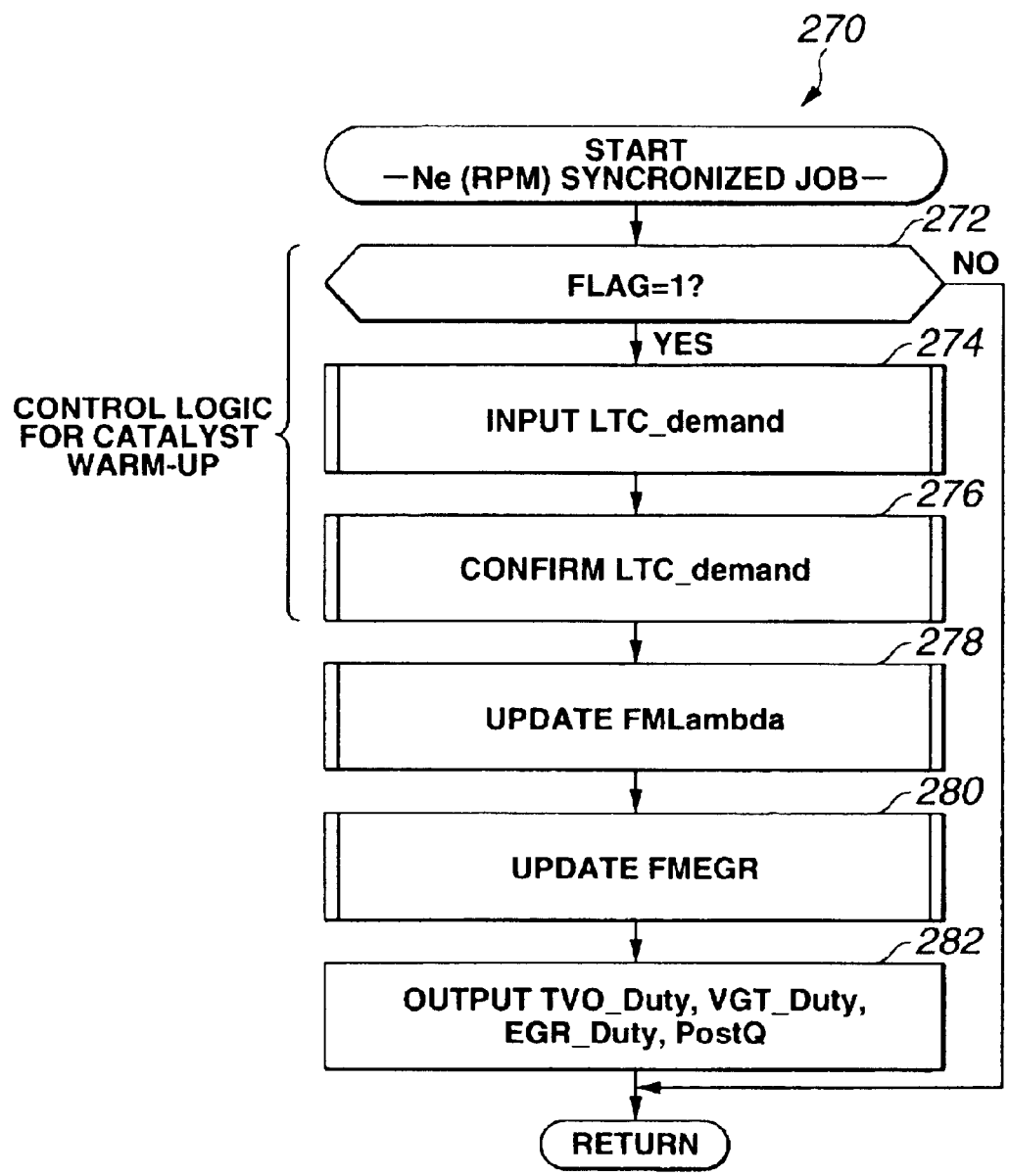
FIG. 18 is a flow diagram illustrating an embodiment of the invention.

With reference to FIG. 18, an example of how controller 50 (see FIG. 1) would implement the present invention can be understood. The flow diagram in FIG. 18 illustrates a control routine, generally indicated at 270. The control routine is engine speed Ne (rpm) synchronized job.

In FIG. 18, at interrogation box 272, the controller determines whether or not flag FLAG is set or not. The flag FLAG is controlled by repeating execution of one of flow diagrams in FIGS. 19 and 20. If FLAG is set at box 272, the routine goes to input box 274. If this is not the case, the routine returns.

At input box 274, the controller inputs LTC_demand. The LTC_demand is calculated by repeating execution of one of flow diagrams in FIGS. 21 to 25. Next, the routine goes to box 276. The LTC_demand at box 274 is confirmed by repeating execution of one of flow diagrams in FIGS. 26 to 29.

At box 276, the controller inputs the confirmed LTC_demand from one of flow diagrams in FIGS. 26 to 29.

It will be appreciated that boxes 272, 274 and 276 constitute control logic for catalyst warm-up in this implementation of the present invention. After box 276, the control routine goes to box 278.

Figure 43:
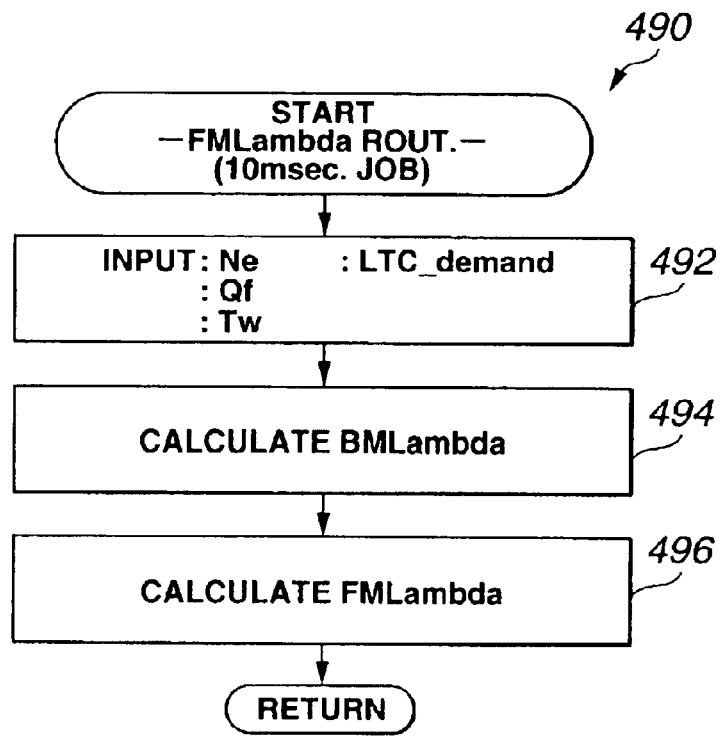
FIG. 43 is a flow diagram illustrating an example of a final desired excess air ratio FMLambda routine.

At box 278, the controller inputs modified desired value FMLamda of excess air ratio, which is calculated by repeating execution of flow diagram in FIG. 43. After box 278, the control routine goes to box 280.

Figure 35:
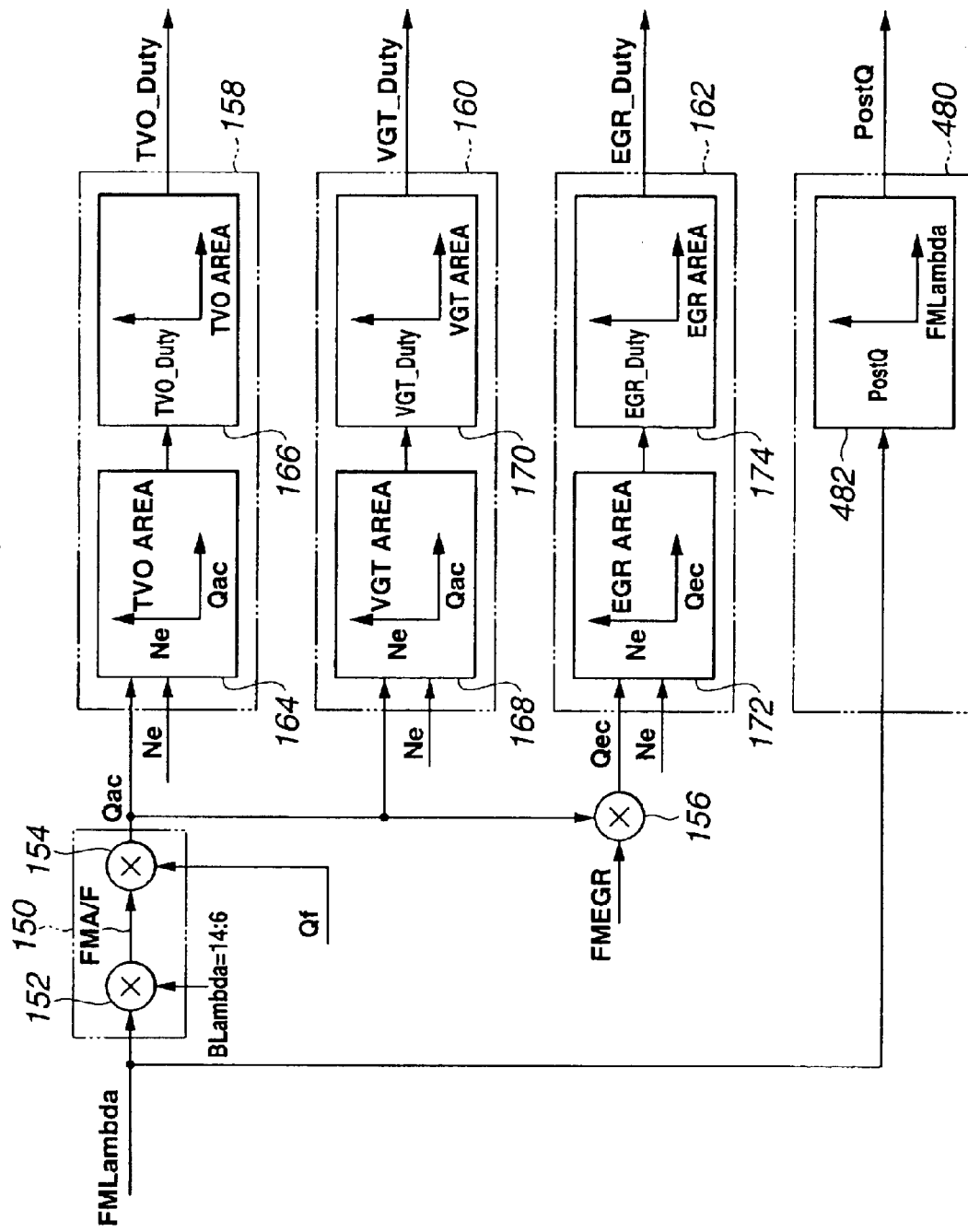
FIG. 35 is a block diagram illustrating an example of other portion of the engine control system.
Figure 36:
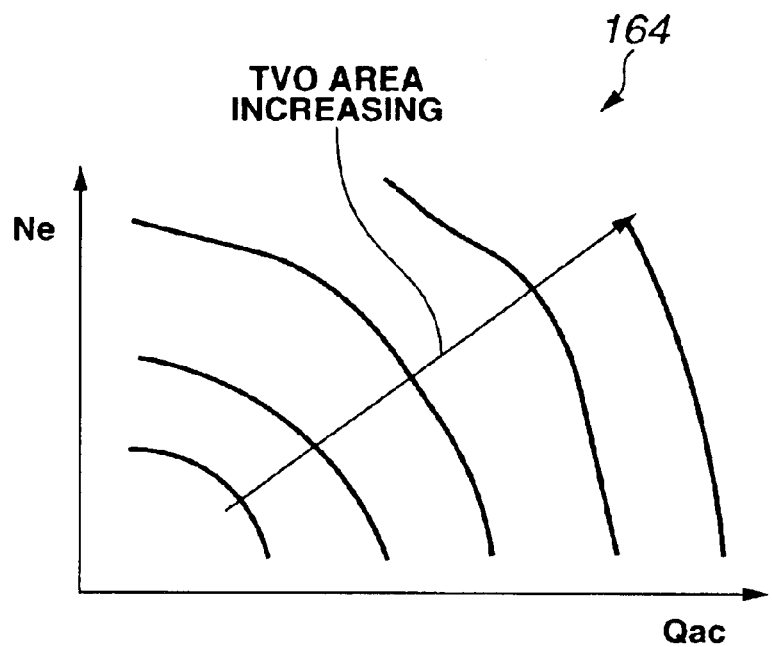
FIG. 36 is a graph depicting a throttle valve opening area TVO AREA versus engine speed Ne and a desired air quantity Qac.
Figure 37:
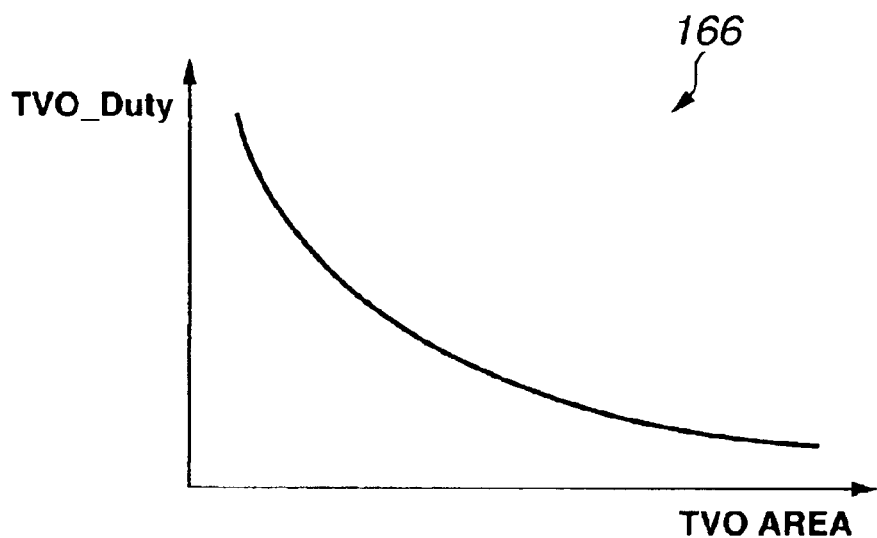
FIG. 37 is a graph depicting a throttle valve position TVO_Duty versus TVO AREA.
Figure 44:
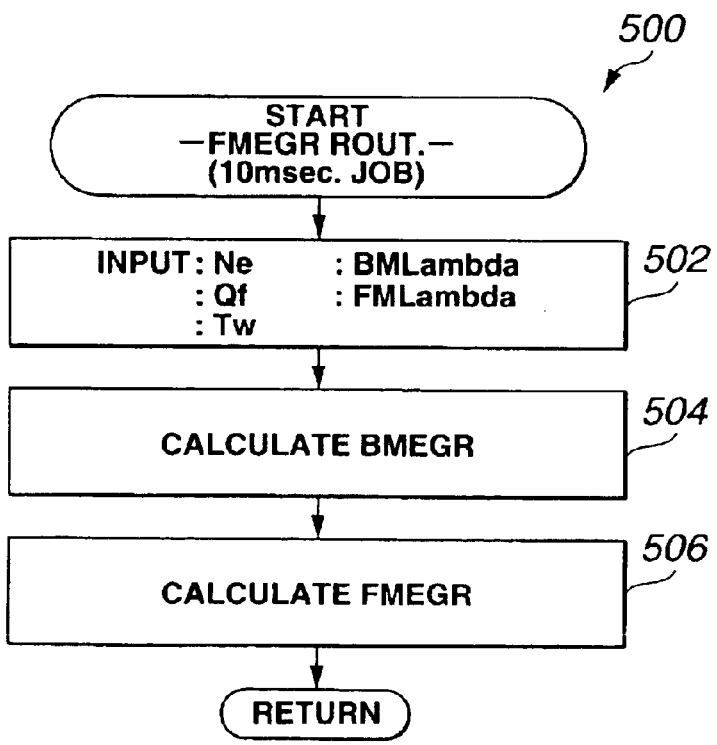
FIG. 44 is a flow diagram illustrating an example of a final desired EGR ratio FMEGR routine.

At box 280, the controller inputs modified desired value FMEGR of EGR ratio, which is calculated by repeating execution of flow diagram in FIG. 44. After box 280, using FMLambda and FMEGR as inputs, the controller determines and outputs TVO_Duty, VGT_Duty, EGR_Duty and PostQ. An example of determining them is illustrated in FIG. 35.

With reference to FIG. 19, an example of how the controller would control FLAG can be understood. A flow diagram in FIG. 19 illustrates a FLAG control routine, generally indicated at 290. Execution of the control routine 290 is repeated at the regular interval of, for example, 10 milliseconds.

At input box 292 in FIG. 19, the controller receives coolant temperature sensor input Tw. At the next interrogation box 294, the controller determines whether the coolant temperature Tw is lower than an established temperature threshold TW*. If this is the case, the control routine goes to box 296 where the controller sets FLAG. If this is not the case, the control routine goes to box 298 where the controller resets FLAG.

With reference to FIG. 20, another example of how the controller would control FLAG can be understood. A flow diagram in FIG. 20 illustrates a FLAG control routine, generally indicated at 300. Execution of the control routine 300 is repeated at the regular interval of, for example, 10 milliseconds.

At input box 302 in FIG. 20, the controller receives catalyst bed temperature sensor input Tbed. At the next interrogation box 304, the controller determines whether the catalyst bed temperature Tw is lower than an established temperature threshold TBED*. If this is the case, the control routine goes to box 306 where the controller sets FLAG. If this is not the case, the control routine goes to box 308 where the controller resets FLAG.

With reference to FIG. 21, an example of how the controller would calculate or determine LTC_demand can be understood. A flow diagram in FIG. 21 illustrates an LTC_demand calculation routine, generally indicated at 310. Execution of the calculation routine 310 is repeated at the regular interval of, for example, 10 milliseconds.

At input box 312 in FIG. 21, the controller receives cylinder wall temperature sensor input Twall. At the next interrogation box 314, the controller determines whether the cylinder wall temperature Twall is higher than an established temperature threshold #TWALL. If this is the case, the calculation routine goes to box 316 where the controller determines LTC_demand as equal to 1 If this is not the case, the calculation routine goes to box 318 where the controller determines LTC_demand as equal to 0 (zero).

With reference to FIG. 22, another example of how the controller would calculate or determine LTC_demand can be understood. A flow diagram in FIG. 22 illustrates an LTC_demand calculation routine, generally indicated at 320. Execution of the calculation routine 320 is repeated at the regular interval of, for example, 10 milliseconds.

At input box 322 in FIG. 22, the controller receives engine speed input Ne (rpm). At the next interrogation box 324, the controller determines whether the engine speed Ne has reached an established engine speed threshold #NE. If this is the case, the calculation routine goes to box 326 where the controller recognizes that engine has achieved self-sustained operation and sets start bit ST_BIT (ST_BIT=1). After box 326, the calculation routine goes to box 328 for measuring time after ST_BIT being set. At box 328, the controller receives a timer count input TIME from a timer that was started upon ST_BIT being set. At the next interrogation box 330, the controller determines whether the timer count TIME has achieved time threshold #TIME. If this is the case, the counting routine goes to box 332 where the controller determines LTC_demand as equal to 1. If, at box 324, it is determined that engine speed Ne is still lower than threshold #NE and engine has not achieved self-sustained operation, the counting routine goes to box 334. At box 334, the controller reset ST_BIT (ST_BIT=0). After box 334, the counting routine goes to box 336. At box 336, the controller determines LTC_demand as equal to 0 (zero). If, at box 330, it is determined that TIME is less than #TIME, the calculating routine goes to box 336 where the controller determines LTC_demand as equal to 0 (zero).

With reference to FIG. 23, still another example of how the controller would calculate or determine LTC_demand can be understood. A flow diagram in FIG. 23 illustrates an LTC_demand calculation routine, generally indicated at 340. Execution of the calculation routine 340 is repeated at the regular interval of, for example, 10 milliseconds.

With reference to FIG. 24, further example of how the controller would calculate or determine LTC_demand can be understood. A flow diagram in FIG. 24 illustrates an LTC_demand calculation routine, generally indicated at 370. Execution of the calculation routine 370 is repeated at the regular interval of, for example, 10 milliseconds. Before describing on the calculation routine in FIG. 23, the calculation routine 370 in FIG. 24 is described below.

At input box 372 in FIG. 24, the controller receives idle speed quantity input Qfidle. At the next interrogation box 374, the controller determines whether the idle fuel quantity Qfidle is less than an established idle fuel quantity threshold #Qfidle. If this is the case, the calculation routine goes to box 376 where the controller determines LTC_demand as equal to 1. If this is not the case, the calculation routine goes to box 378 where the controller determines LTC_demand as equal to 0 (zero).

Turning back to FIG. 23, the calculation routine 340 is described below.

At input box 342, the controller receives coolant temperature sensor input Tw. At the next box, the controller determines time threshold #TIME as a function of coolant temperature Tw by retrieving a look-up map containing data as illustrated by the curve 238 in FIG. 12. After box 344, the calculation routine goes to input box 346. At input box 346, the controller receives engine speed input Ne (rpm). At the next interrogation box 348, the controller determines whether the engine speed Ne has reached an established engine speed threshold #NE. If this is the case, the calculation routine goes to box 350 where the controller recognizes that engine has achieved self-sustained operation and sets start bit ST_BIT (ST_BIT=1). After box 352, the calculation routine goes to box 358 for measuring time after ST_BIT being set. At box 358, the controller receives a timer count input TIME from a timer that was started upon ST_BIT being set. After box 352, the calculation routine goes to box 354. At box 354, the controller calculates dTIME by subtracting TIME from threshold #TIME. At the next block 356, the controller determines LTC_demand as a function of dTIME by retrieving a look-up table as illustrated by the curve 240 in FIG. 13. If, at box 348, it is determined that engine speed Ne is still lower than threshold #NE and engine has not achieved self-sustained operation, the calculating routine goes to box 358. At box 358, the controller resets ST_BIT (ST_BIT=0). After box 358, the calculating routine goes to box 360. At box 360, the controller determines LTC_demand as equal to 0 (zero).

Figure 13:
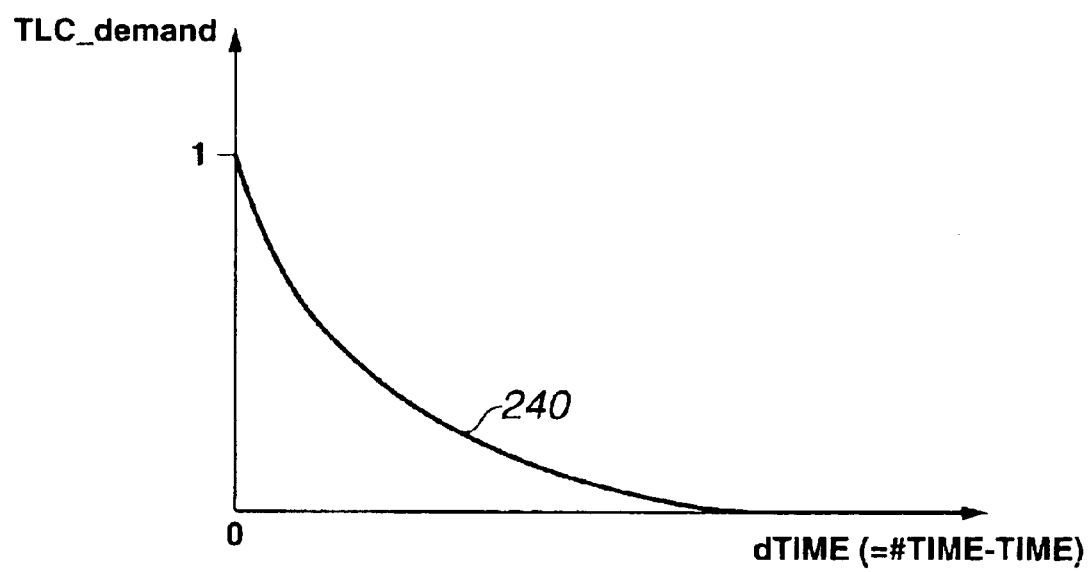
FIG. 13 is a graph depicting LTC_demand verses dTIME (=#TIME−TIME).
Figure 14:
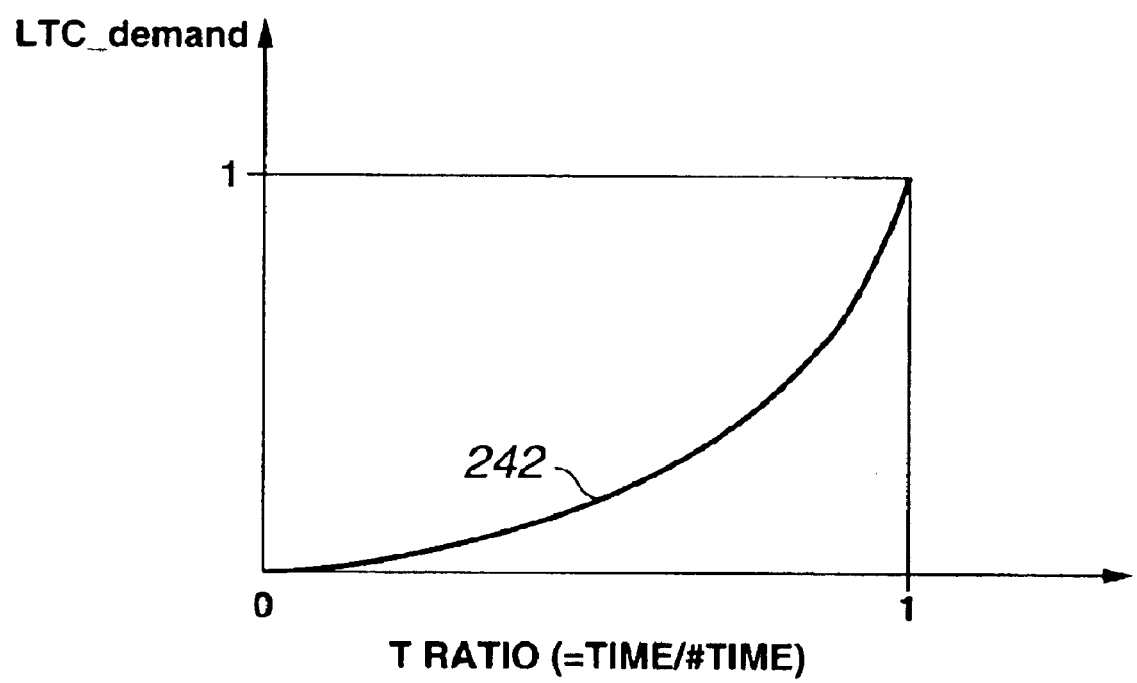
FIG. 14 is a graph depicting LTC_demand versus TRATIO (=TIME/#TIME).

In the preceding description of LTC_demand calculation routine 340, the controller determines LTC_demand by retrieving the curve 240 in FIG. 13 using dTIME (see box 354). If desired, the controller may retrieve the curve 242 in FIG. 14 to determine LTC_demand. In this case, the controller repeats calculation of a ratio TRATIO (=TIME/#TIME) and uses it in retrieving the curve 242 in FIG. 17.

With reference to FIG. 25, other example of how the controller would calculate or determine LTC_demand can be understood. A flow diagram in FIG. 25 illustrates an LTC_demand calculation routine, generally indicated at 380. Execution of the calculation routine 380 is repeated at the regular interval of, for example, 10 milliseconds.

In FIG. 25, at input box 382, the controller receives engine speed input Ne (rpm). At the next interrogation box 384, the controller determines whether the engine speed Ne has reached an established engine speed threshold #NE. If this is the case, the calculation routine goes to box 386 where the controller recognizes that engine has achieved self-sustained operation and sets start bit ST_BIT (ST_BIT=1). After box 386, the calculation routine goes to input box 388. At box 388, the controller receives an idle fuel quantity input Qfidle. After box 388, the calculation routine goes to box 390. At box 390, the controller calculates dQfidle by subtracting idle fuel quantity threshold #Qfidle from Qfidle. At the next block 392, the controller determines LTC_demand as a function of dQfidle by retrieving a look-up table as illustrated by the curve 258 in FIG. 16. If, at box 384, it is determined that engine speed Ne is still lower than threshold #NE and engine has not achieved self-sustained operation, the counting routine goes to box 394. At box 394, the controller resets ST_BIT (ST_BIT=0). After box 394, the calculating routine goes to box 396. At box 396, the controller determines LTC_demand as equal to 0 (zero).

Figure 16:
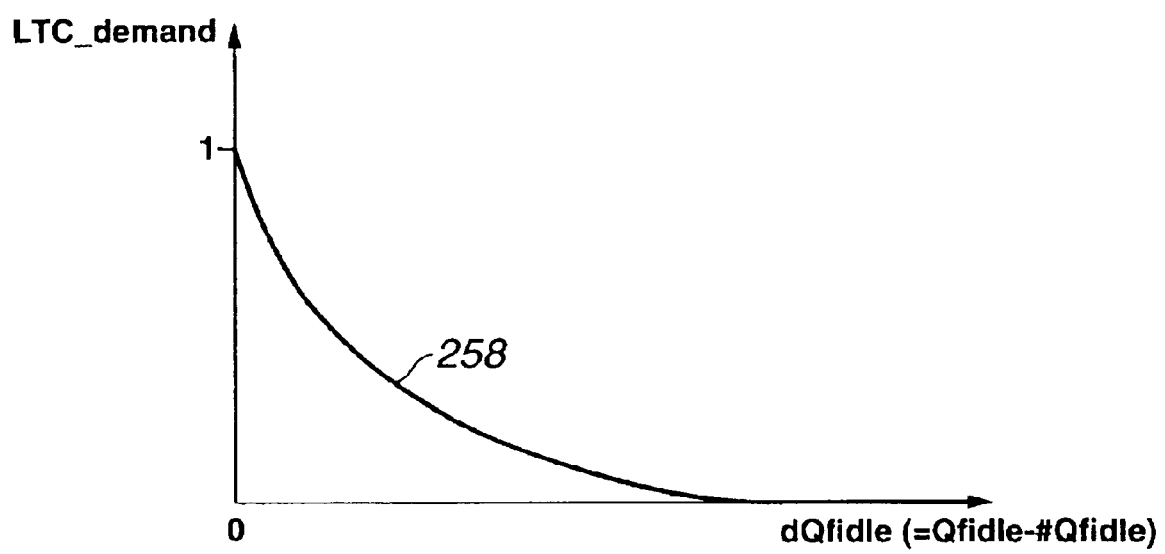
FIG. 16 is a graph depicting LTC_demand versus dQfidle (=Qfidle−#Qfidle).
Figure 17:
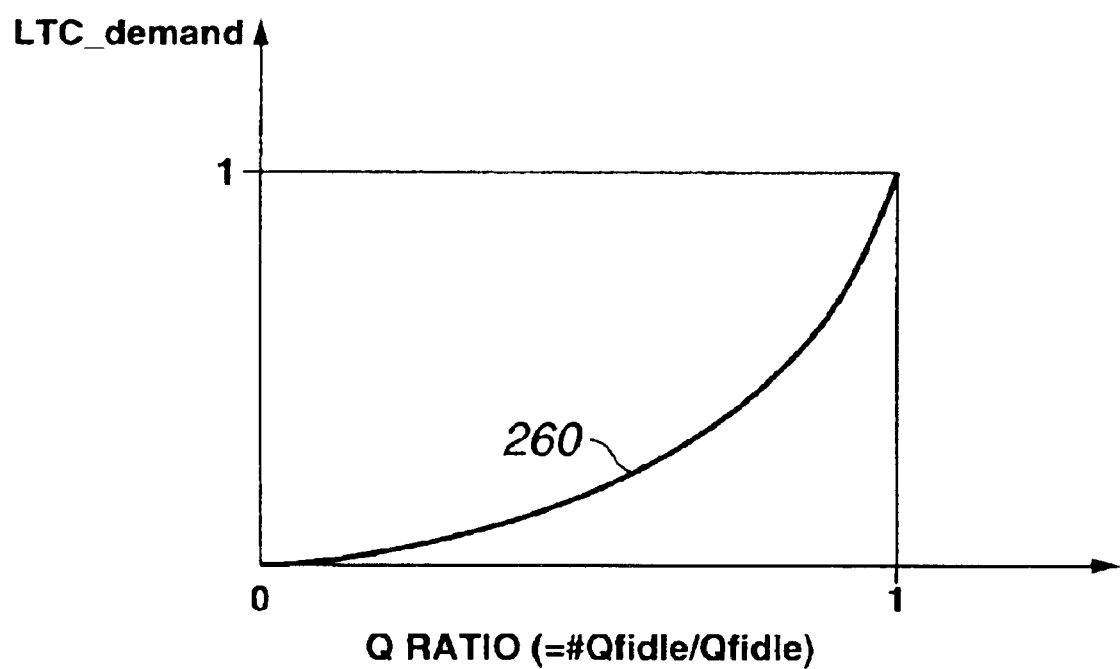
FIG. 17 is a graph depicting LTC_demand versus QRATIO (=#Qfidle/Qfidle).

In the preceding description of LTC_demand calculation routine 380, the controller determines LTC_demand by retrieving the curve 258 in FIG. 16 using dQfidle (see box 390). If desired, the controller may retrieve the curve 260 in FIG. 17 to determine LTC_demand. In this case, the controller repeats calculation of a ratio QRATIO (=#Qfidle/Qfidle) and uses it in retrieving the curve 260 in FIG. 17.

Figure 26:
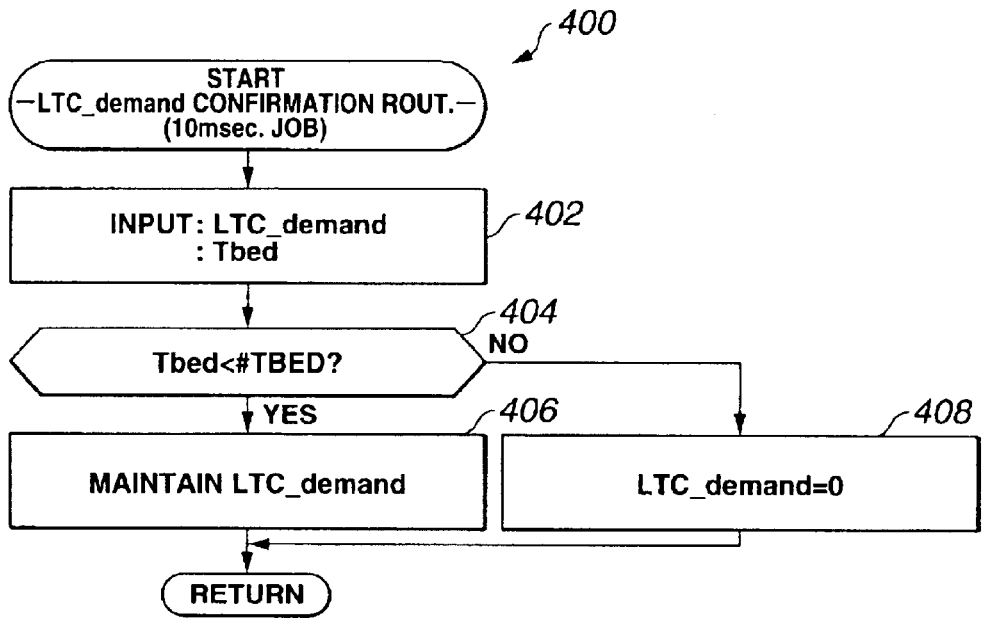
FIG. 26 is a flow diagram of one example of an LTC_demand confirmation routine of the invention.

With reference to FIG. 26, an example of how the controller would confirm LTC_demand can be understood. A flow diagram in FIG. 26 illustrates an LTC_demand confirmation routine, generally indicated at 400. Execution of the confirmation routine 400 is repeated at the regular interval of, for example, 10 milliseconds.

In FIG. 26, at input box 402, the controller receives the stored LTC_demand from box 274 of routine 270 in FIG. 18 and catalyst bed temperature sensor input Tbed. At the next interrogation box 404, the controller determines whether or not catalyst bed temperature Tbed is lower than a catalyst bed temperature threshold #TBED. If this is the case, the confirmation routine goes to box 406 where the controller maintains the LTC_demand as it is. If this is not the case, the confirmation routine goes to box 408 where the controller determines the LTC_demand as equal to 0 (zero).

Figure 27:
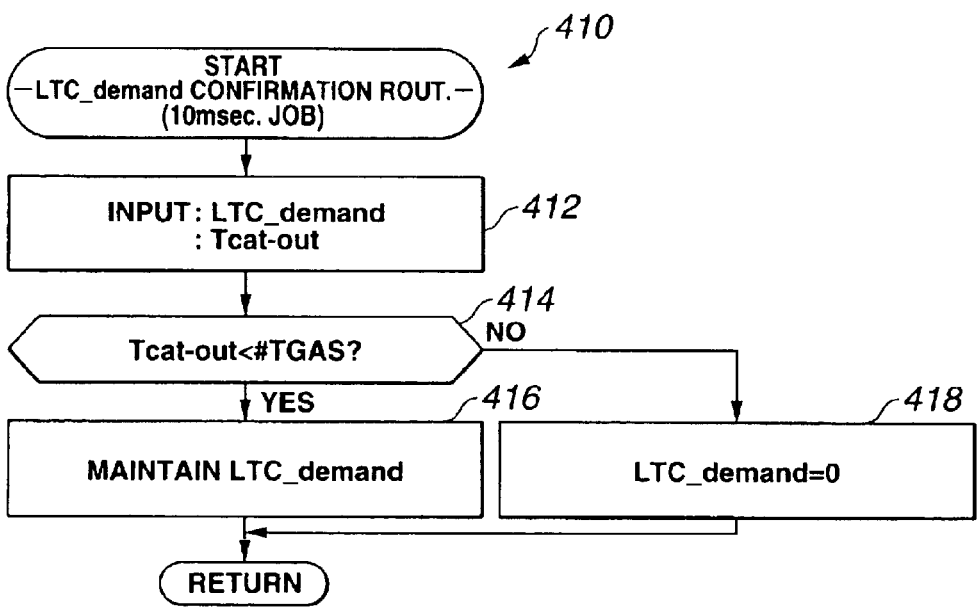
FIG. 27 is a flow diagram of another example of an LTC_demand confirmation routine of the invention.

With reference to FIG. 27, another example of how the controller would confirm LTC_demand can be understood. A flow diagram in FIG. 27 illustrates an LTC_demand confirmation routine, generally indicated at 410. Execution of the confirmation routine 410 is repeated at the regular interval of, for example, 10 milliseconds.

In FIG. 27, at input box 412, the controller receives the stored LTC_demand from box 274 of routine 270 in FIG. 18 and catalyst out temperature sensor input Tcat-out. At the next interrogation box 414, the controller determines whether or not catalyst out temperature Tcat-out is lower than a catalyst out temperature threshold #TGAS. If this is the case, the confirmation routine goes to box 416 where the controller maintains the LTC_demand as it is. If this is not the case, the confirmation routine goes to box 418 where the controller determines the LTC_demand as equal to 0 (zero).

Figure 28:
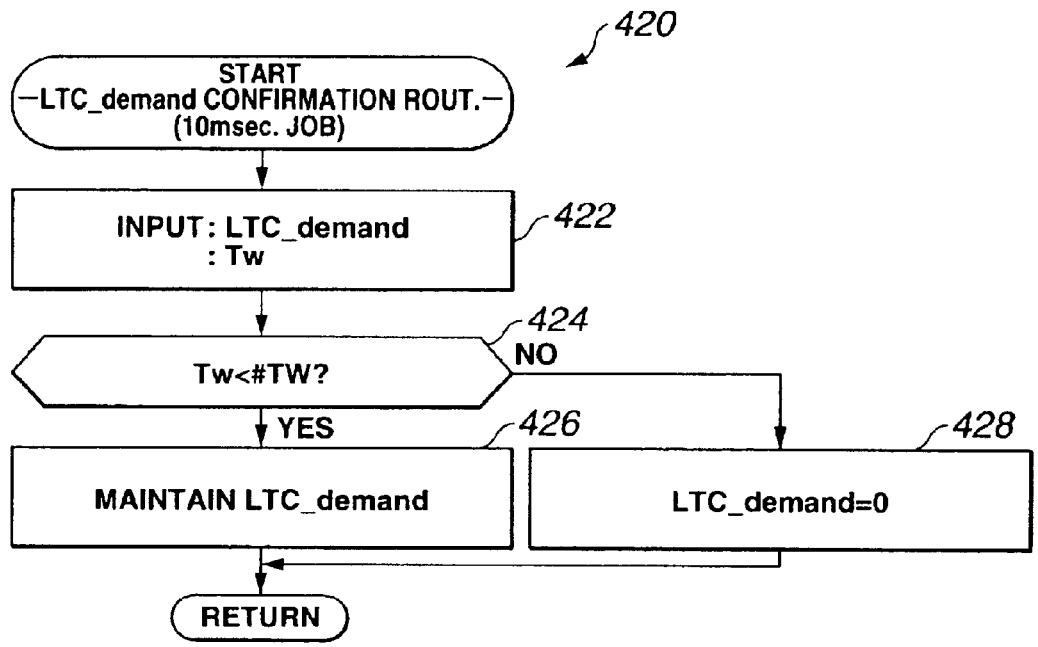
FIG. 28 is a flow diagram of still another example of an LTC_demand confirmation routine of the invention.

With reference to FIG. 28, a further example of how the controller would confirm LTC_demand can be understood. A flow diagram in FIG. 28 illustrates an LTC_demand confirmation routine, generally indicated at 420. Execution of the confirmation routine 420 is repeated at the regular interval of, for example, 10 milliseconds.

In FIG. 28, at input box 422, the controller receives the stored LTC_demand from box 274 of routine 270 in FIG. 18 and coolant temperature sensor input Tw. At the next interrogation box 424, the controller determines whether or not coolant temperature Tw is lower than a coolant temperature threshold #TW. If this is the case, the confirmation routine goes to box 426 where the controller maintains the LTC_demand as it is. If this is not the case, the confirmation routine goes to box 428 where the controller determines the LTC_demand as equal to 0 (zero).

Figure 29:
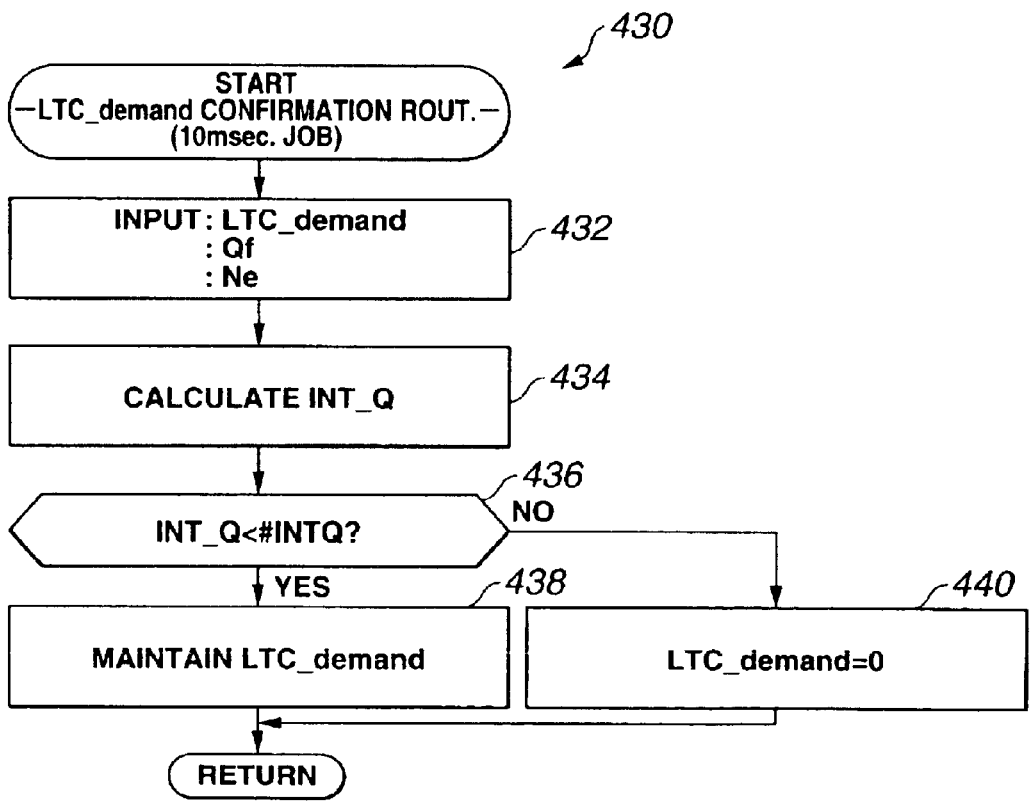
FIG. 29 is a flow diagram of other example of an LTC_demand confirmation routine of the invention.

With reference to FIG. 29, other example of how the controller would confirm LTC_demand can be understood. A flow diagram in FIG. 29 illustrates an LTC_demand confirmation routine, generally indicated at 430. Execution of the confirmation routine 430 is repeated at the regular interval of, for example, 10 milliseconds.

In FIG. 29, at input box 432, the controller receives the stored LTC_demand from box 274 of routine 270 in FIG. 18, fuel quantity input Qf and engine speed sensor input Ne. At the next box 434, the controller calculates the integral of fuel quantity INT_Q using arithmetic operation as illustrated by block diagram in FIG. 30. At the next interrogation box 436, the controller determines whether or not INT_Q is less than a threshold #INTQ. If this is the case, the confirmation routine goes to box 438 where the controller maintains the LTC_demand as it is. If this is not the case, the confirmation routine goes to box 440 where the controller determines the LTC_demand as equal to 0 (zero).

As explained before, INT_Q may be expressed by the equation 1. An example of how the controller would calculate INT_Q can be understood with reference to FIG. 30. At block 442, the following formula is calculated using fuel quantity input Qf and engine speed sensor input Ne, $$Ne/(60 \times 50)/2 \times Ncyl \times Qf \qquad \text{Eq. 2}$$

where: Ncyl is the number of cylinders.

A summing point 446 receives, as a first input, an output from block 442 and, as a second input, an output from a block 444. At summing point 446, the sum of the two inputs is given. An output of summing point 446 is generated as INT_Q. Block 444 receives, as an input, the output from summing point 446. At block 444, a delay is added.

Figure 31:
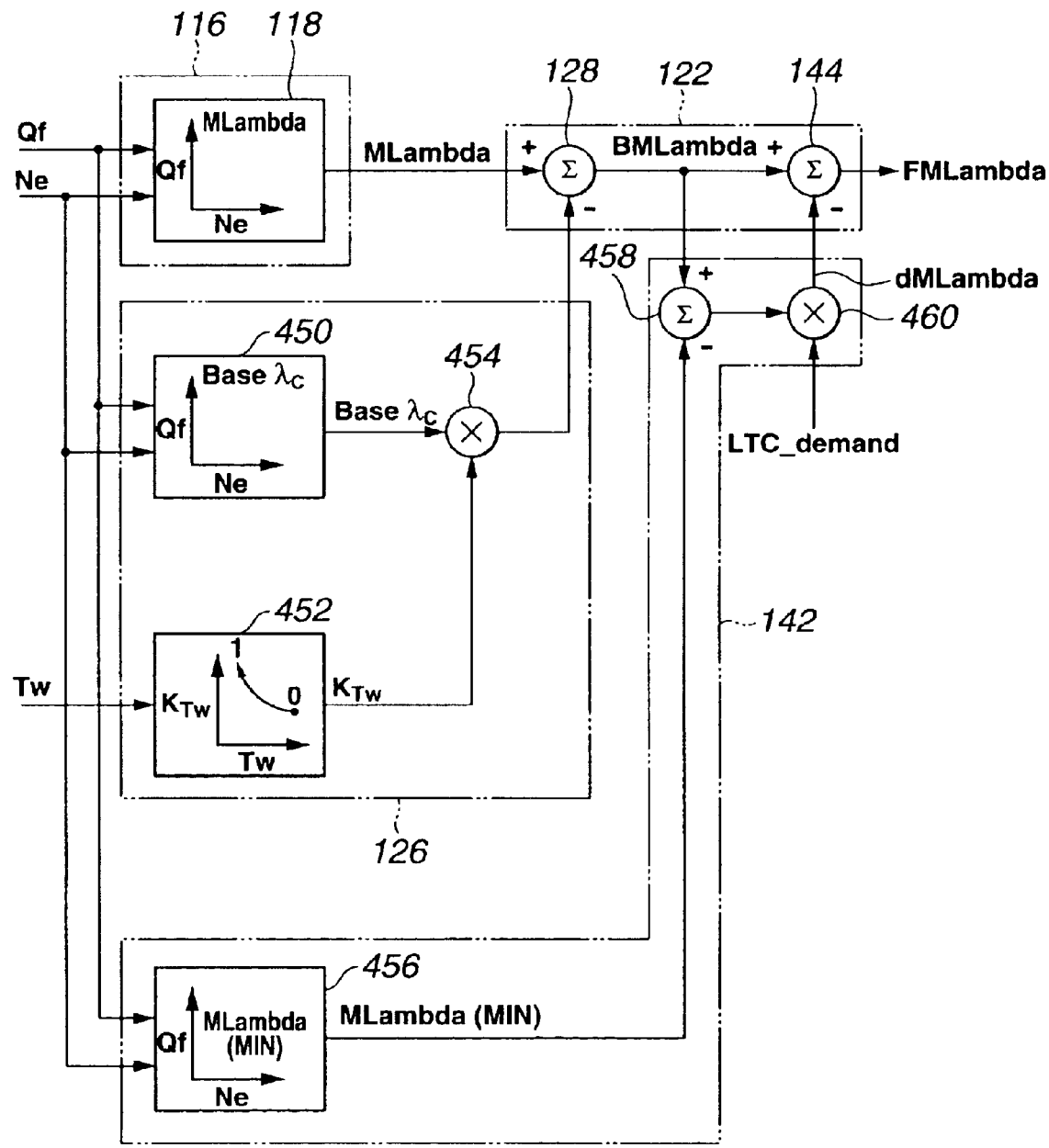
FIG. 31 is a block diagram illustrating an example of a portion of the engine control system.

With reference to FIG. 31, an example of how a desired value BMLambda of excess air ratio and a modified desired value FMLambda of excess air ratio would be calculated can be undersood. FIG. 31 illustrates a block diagram of a part of an exemplary embodiment. The illustrated part in FIG. 31 is substantially the same as its counterpart of the embodiment illustrated in FIG. 2. Thus, the same reference numerals are used in FIGS. 2 and 31 to denote like or similar blocks. The embodiment in FIG. 31 is different from the previous embodiment in FIG. 2 in that, within a coolant temperature dependent correction block 126, a look-up map 450, a look-up table 452 and a multiplying point 454 are illustrated, and, within a reduction in excess air ratio determination block 142, a look-up map 456, a summing point 458 and a multiplying point 460 are illustrated.

Block 126 in FIG. 31 receives a fuel quantity input Qf and an engine speed input Ne in addition to a coolant temperature sensor input Tw. Base values $\lambda_c$ are contained within look-up map 450 for various engine speed and fuel quantity conditions. The appropriate one of base values $\lambda_c$ for current engine speed and fuel quantity condition is provided to multiplying point 454. Values of coolant temperature correction coefficient $K_{Tw}$ are contained within look-up table 452 for various coolant temperature conditions. The values range from 0 to 1 in the embodiment. The appropriate one of coolant temperature correction coefficient $K_{Tw}$ values is provided to multiplying point 454. At multiplying point 454, the two inputs are multiplied to give a coolant temperature dependent correction value. Block 126 provides the coolant temperature dependent correction value to a summing point 128 within a block 122. Summing point 128 subtracts the correction value provided by block 126 from set point value MLambda provided by a block 116 to determine desired value BMLamda.

Block 142 in FIG. 31 receives a fuel quantity input Qf and an engine speed input Ne in addition to LTC_demand. Minimum set point values MLambda(MIN) of excess air ratio are contained within look-up map 456 for various engine speed and fuel quantity conditions. The appropriate one of minimum set point values MLamda(MIN) for current engine speed and fuel quantity condition is provided to a summing point 458. The desired value BMLambda of excess air ratio is provided to summing point 458. At summing point 458, the minimum set point value MLambda(MIN) is subtracted from the desired value BMLambda to provide an allowance to multiplying point 460. Multiplying point 460 receives LTC_demand. At multiplying point 460, the two inputs are multiplied to give dMLambda. Block 142 provides dMLambda to summing point 144 within block 122. At summing point 144, modified desired value FMLambda is given by subtracting dMLambda from BMLambda. Block 122 generates the modified desired value FMLambda.

Figure 32:
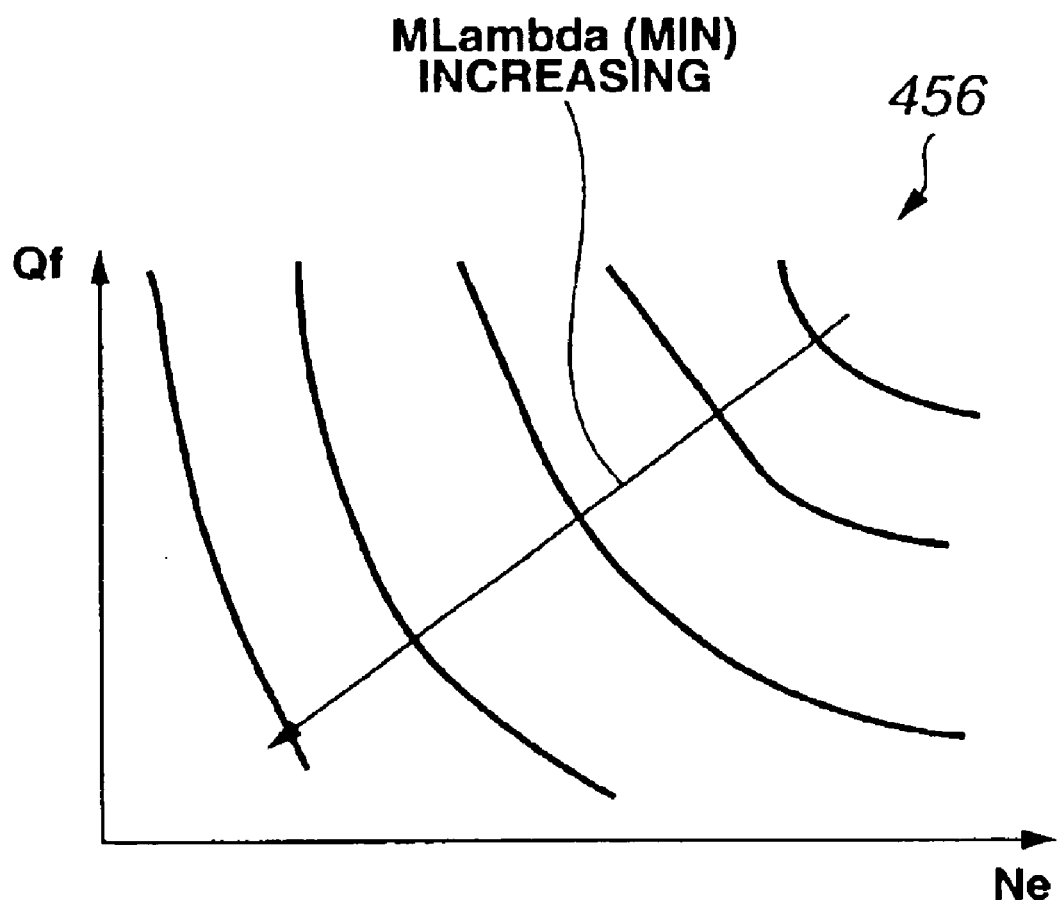
FIG. 32 is a graph depicting a minimum set-point of excess air ratio MLambda(MIN) versus fuel quantity Qf and engine speed Ne.

An example of how minimum set point values MLambda (MIN) of excess air ratio are contained within map 456 can be understood with reference to FIG. 32.

Figure 33:
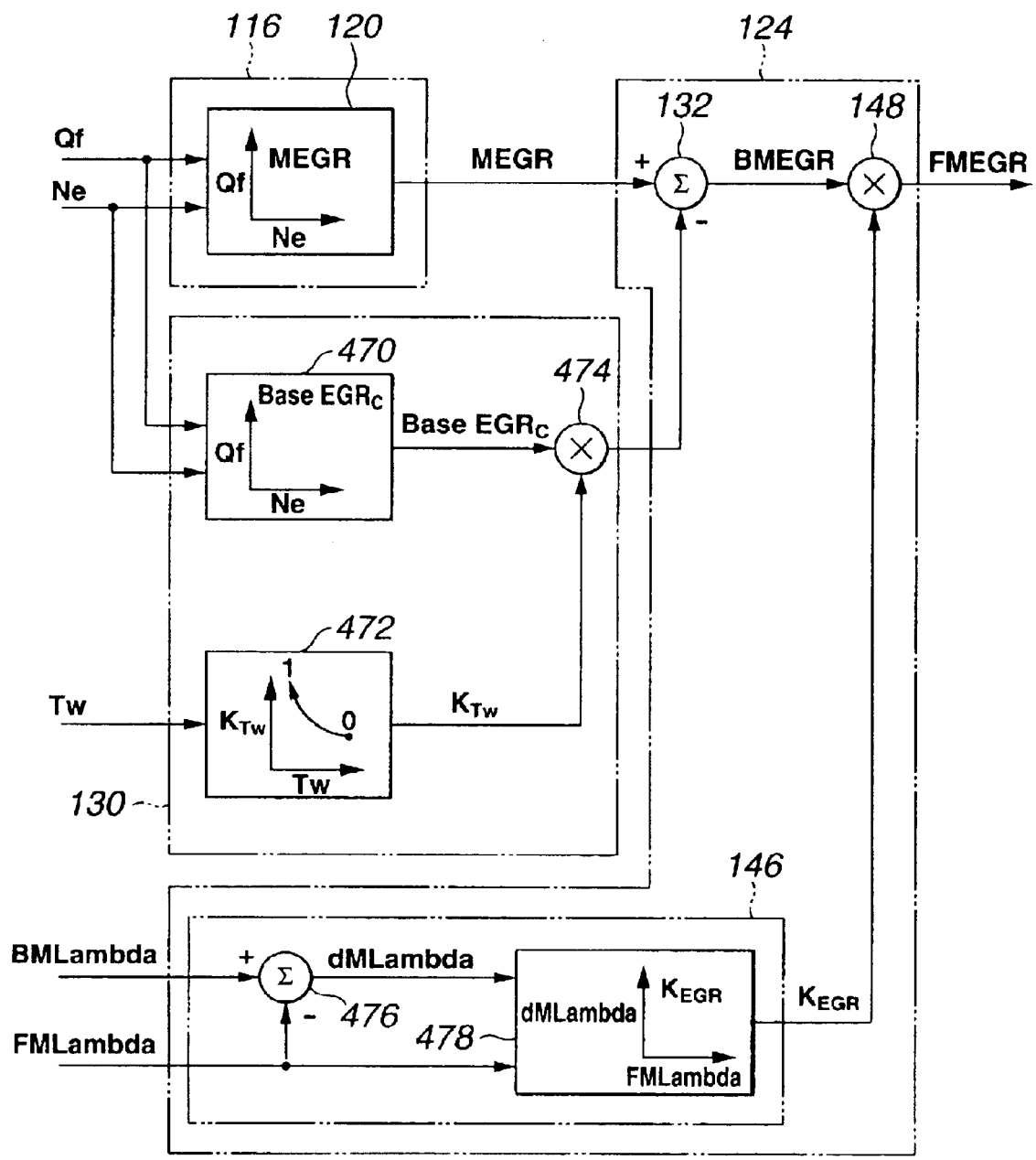
FIG. 33 is a block diagram illustrating an example of another portion of the engine control system.

With reference to FIG. 33, an example of how a desired value BMEGR and a modified desired value FMEGR would be calculated can be understood. FIG. 33 illustrates a block diagram of a part of an exemplary embodiment. The illustrated part in FIG. 33 is substantially the same as its counterpart of the embodiment illustrated in FIG. 2. Thus, the same reference numerals are used in FIGS. 2 and 33 to denote like or similar blocks. The embodiment in FIG. 33 is different from the previous embodiment in FIG. 2 in that, within a coolant temperature dependent correction block 130, a look-up map 470, a look-up table 472 and a multiplying point 474 are illustrated, and, within a coefficient block 146, a summing point 476 and a look-up map 478 are illustrated.

Block 130 in FIG. 33 receives a fuel quantity input Qf and an engine speed input Ne in addition to a coolant temperature sensor input Tw. Base values $EGR_c$ are contained within look-up map 470 for various engine speed and fuel quantity conditions. The appropriate one of base values $EGR_c$ for current engine speed and fuel quantity condition is provided to multiplying point 474. Values of coolant temperature correction coefficient $K_{Tw}$ are contained within look-up table 472 for various coolant temperature conditions. The values range from 0 to 1 in the embodiment. The appropriate one of coolant temperature correction coefficient $K_{Tw}$ values is provided to multiplying point 474. At multiplying point 474, the two inputs are multiplied to give a coolant temperature dependent correction value. Block 130 provides the coolant temperature dependent correction value to a summing point 132 within a block 124. Summing point 132 subtracts the correction value provided by block 130 from set point value MEGR provided by a block 116 to determine desired value BMEGR. Block 124 receives FMLambda and BMLambda in addition to MEGR from block 116 and the correction value from block 130.

At summing point 476 within coefficient block 146, the reduction dMLambda is calculated from FMLambda and BMLambda. The reduction dMLambda is provided to look-up map 478. In addition to dMLambda, the modified desired value FMLambda is provided to look-up map 478. Values of EGR correction coefficient $K_{EGR}$ are contained within look-up map 478 for various FMLambda and dMLambda conditions. The values range from 0 to 1 in the embodiment. The appropriate one of coolant temperature correction coefficient $K_{EGR}$ values is provided to multiplying point 148. Multiplying point 474 receives BMEGR. At multiplying point 148, $K_{EGR}$ and BMEGR are multiplied to give modified desired value FMEGR. Block 124 generates the modified desired value FMEGR.

Figure 34:
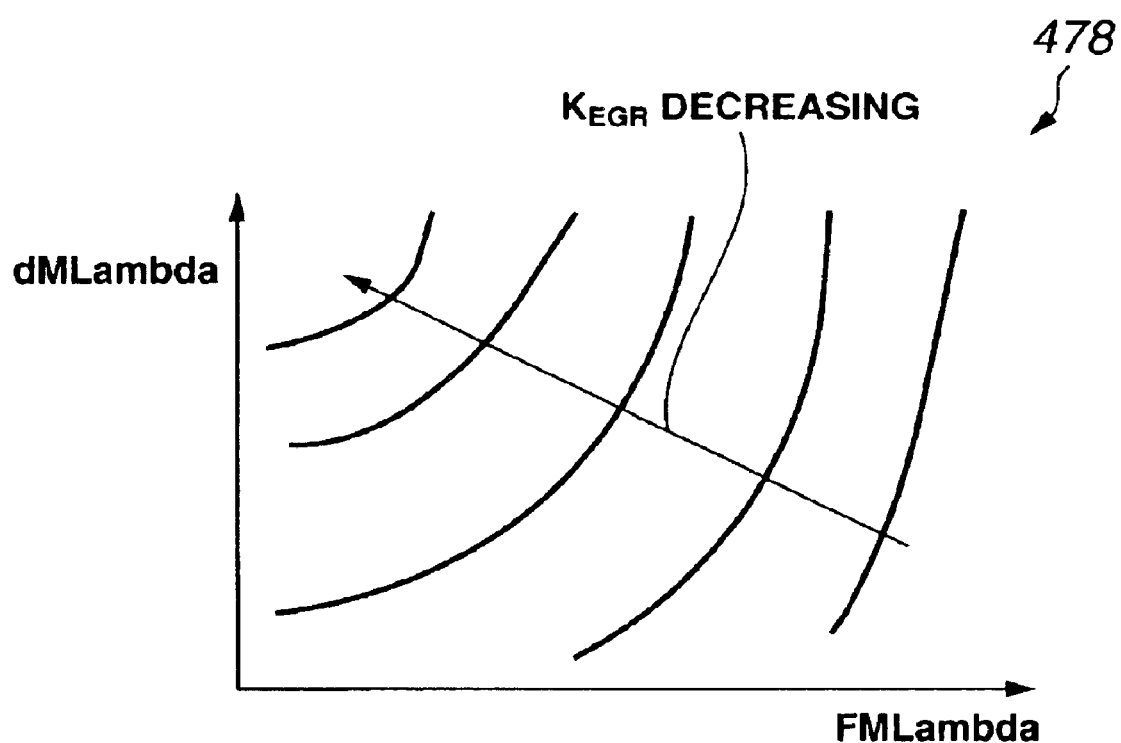
FIG. 34 is a graph depicting a correction coefficient $K_{EGR}$ versus a reduction in excess air ratio dMLambda from a desired or base value of excess air ratio BMLambda to a modified or final desired excess air ratio FMLambda, and the modified desired excess air ratio FMLambda.

An example of how EGR correction coefficient values $K_{EGR}$ are contained within map 478 can be understood with reference to FIG. 34.

A block diagram in FIG. 35 illustrates a part of an exemplary embodiment. The illustrated part is substantially the same as its counterpart of the embodiment illustrated in FIG. 2. Thus, the same reference numerals are used in FIGS. 2 and 33 to denote like or similar blocks. The embodiment in FIG. 35 is different from the previous embodiment in FIG. 2 in provision of a post-ignition fuel injection quantity controller 480. The term "post-ignition fuel injection" is herein used to mean injection of fuel quantity into each cylinder of the engine after ignition of in-cylinder mixture or injection of fuel quantity into exhaust system before exhaust gas treatment device. Post-ignition fuel injection controller 480 receives modified desired value FMLambda. Controller 480 contains a look-up table 482. Values of post-ignition fuel quantity PostQ are contained within look-up table 482 for different FMLambda values. Controller 480 provides PostQ to a device performing the post-ignition fuel injection for increasing the temperature of exhaust gas. This device may include fuel injectors positioned to directly inject fuel into the cylinders.

Referring to FIGS. 36 to 42, the embodiment illustrated in FIG. 35 is further described. An example of how TVO areas are contained in look-up map 164 within TV controller 158 can be understood with reference to FIG. 36. An example of how TVO_Duty values are contained in look-up table 166 within TV controller 158 can be understood with reference to FIG. 37.

Figure 38:
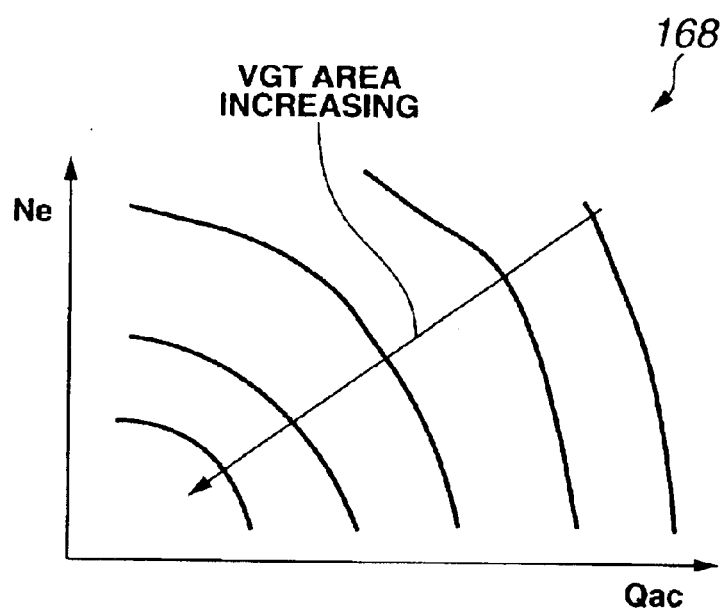
FIG. 38 is a graph depicting a variable geometry turbine area VGT AREA versus engine speed Ne and desired air quantity Qac.
Figure 39:
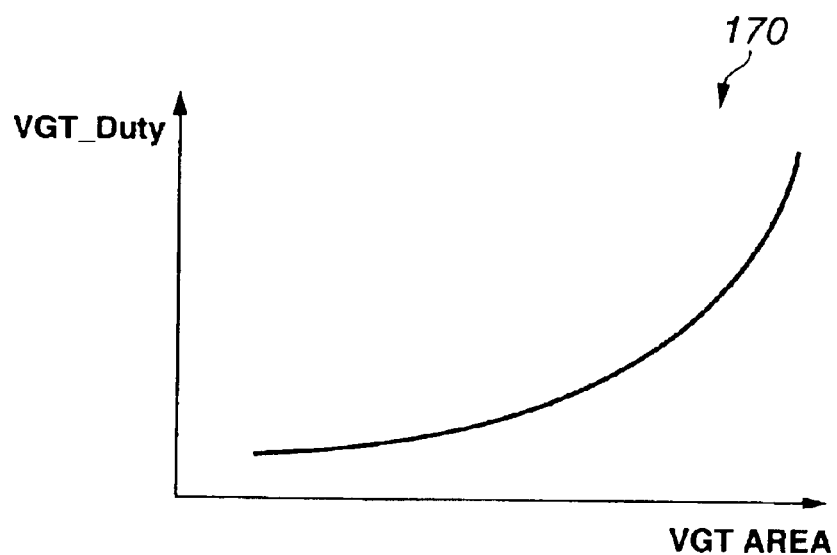
FIG. 39 is a graph depicting a VGT position VGT_Duty is versus VGT AREA.

With reference to FIG. 38, an example of how VGT areas are contained in look-up map 168 within VGT controller 160 can be understood. With reference to FIG. 39, an example of how VGT_Duty values are contained in look-up table 170 within VGT controller 160 can be understood.

Figure 40:
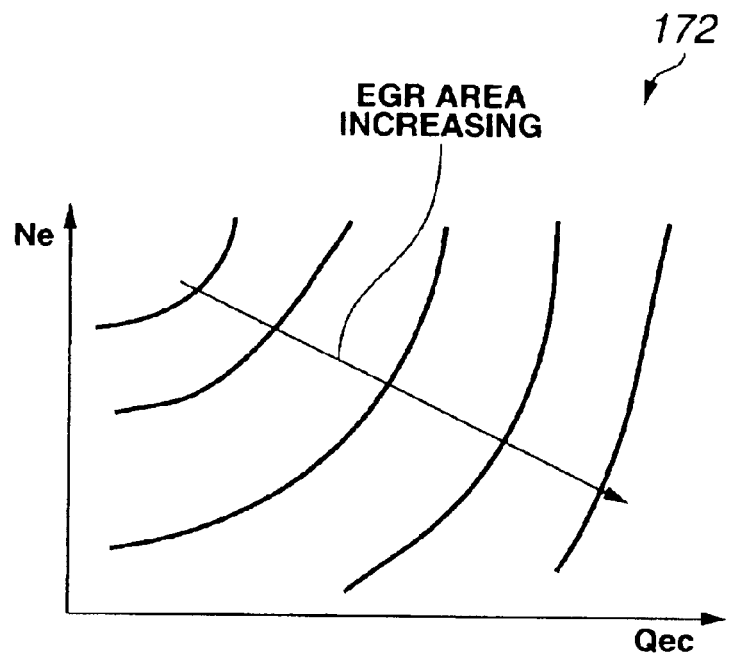
FIG. 40 is a graph depicting an EGR area EGR AREA versus engine speed Ne and desired air quantity Qac.
Figure 41:
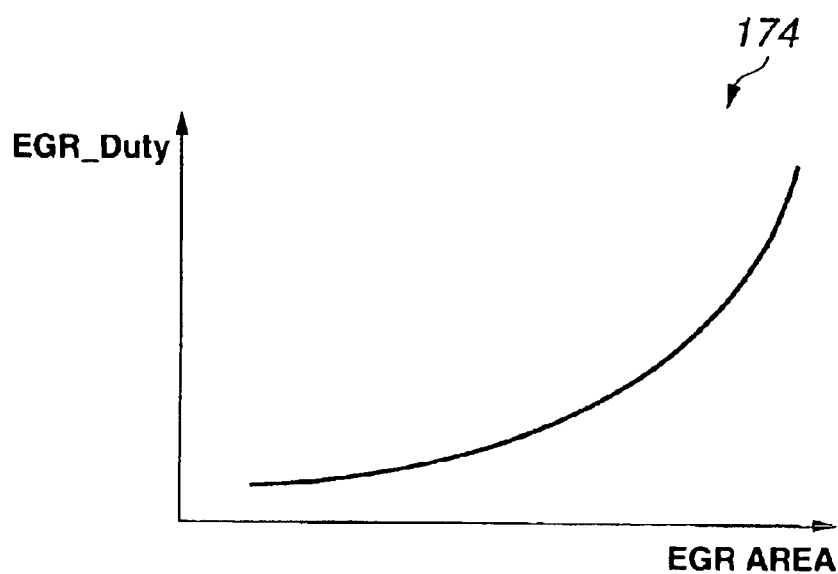
FIG. 41 is a graph depicting an EGR valve position EGR_Duty versus EGR AREA.

With reference to FIG. 40, an example of how EGR areas are contained in look-up map 172 within EGR controller 162 can be understood. With reference to FIG. 41, an example of how EGR_Duty values are contained in look-up table 174 can be understood.

Figure 42:
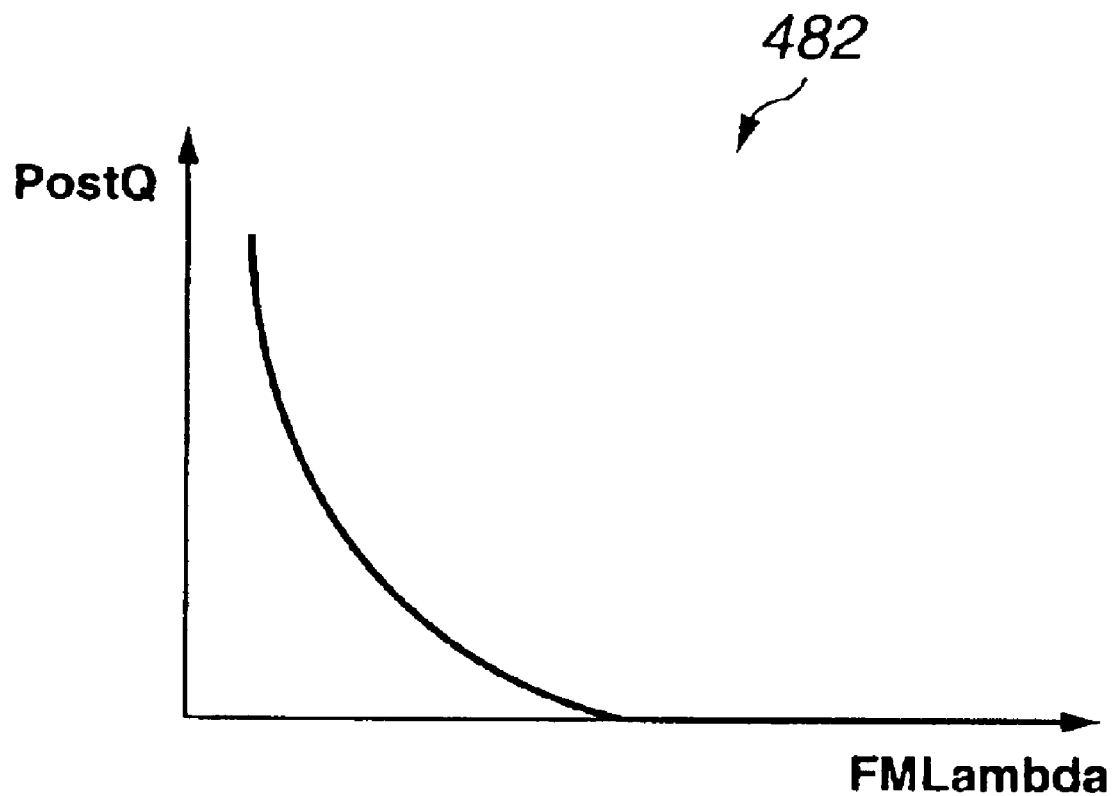
FIG. 42 is a graph depicting a post combustion fuel quantity PostQ versus final desired excess air ratio FMLambda.

With reference to FIG. 42, an example of how PostQ values are contained in look-up table 482 within post-ignition fuel injection quantity controller 480 can be understood.

With reference now to FIG. 43, an example of how the controller would calculate modified desired value FMLambda can be understood. A flow diagram in FIG. 43 illustrates a FMLambda routine, generally indicated at 490. Execution of the routine 490 is repeated at the regular interval of, for example, 10 milliseconds.

In FIG. 43, at input box 492, the controller receives engine speed input Ne, fuel quantity input Qf, coolant temperature sensor input Tw and warm-up demand LTC_demand. At the next box 494, the controller calculates BMLambda in a manner as illustrated in FIG. 31. At the next box 496, the controller calculates FMLambda in a manner as illustrated in FIG. 31.

With reference now to FIG. 44, an example of how the controller would calculate modified desired value FMEGR can be understood. A flow diagram in FIG. 44 illustrates a FMEGR routine, generally indicated at 500. Execution of the routine 500 is repeated at the regular interval of, for example, 10 milliseconds.

In FIG. 44, at input box 502, the controller receives engine speed input Ne, fuel quantity input Qf, coolant temperature sensor input Tw, BMLamda and FMLambda. At the next box 504, the controller calculates BMEGR in a manner as illustrated in FIG. 33. At the next box 506, the controller calculates FMEGR in a manner as illustrated in FIG. 33.

Receiving FMLambda and FMEGR, the controller calculates TVO_Duty, VGT_Duty, EGR_Duty and PostQ in a manner as illustrated in FIG. 35.

Figure 45:
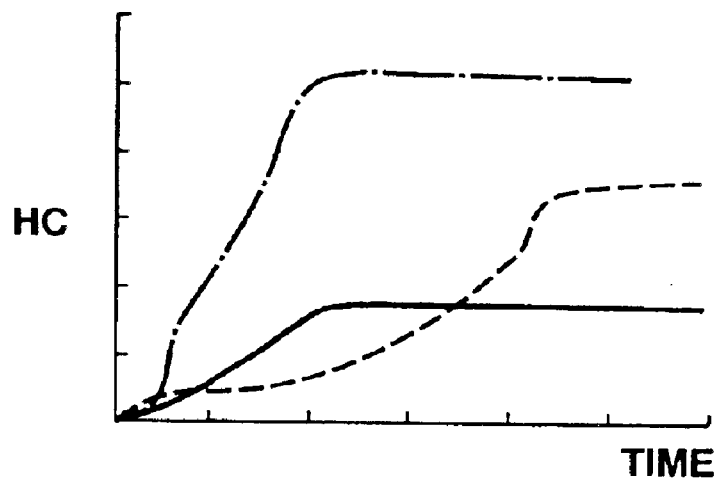
FIG. 45 is a graph depicting a time integral of HC emissions according to an embodiment of the present invention.

With reference to FIG. 45, the vertical axis represents the total amount of HC emissions from the beginning of cold start, while the horizontal axis represents elapse of time from the beginning of cold start. With reference to 46, the vertical axis represents the total amount of NOx emissions from the beginning of cold start, while the horizontal axis represents elapse of time from the beginning of cold start.

The emission performance of the embodiment using LTC_demand, FMLamda, and FMEGR to control TV 16, VGT 14, EGR 32 and post-ignition fuel injection was tested. FMLamda, FMEGR, TVO_Duty, VGT_Duty, EGR_Duty and PostQ were determined using computation techniques illustrated in FIGS. 31, 33 and 35.

Figure 46:
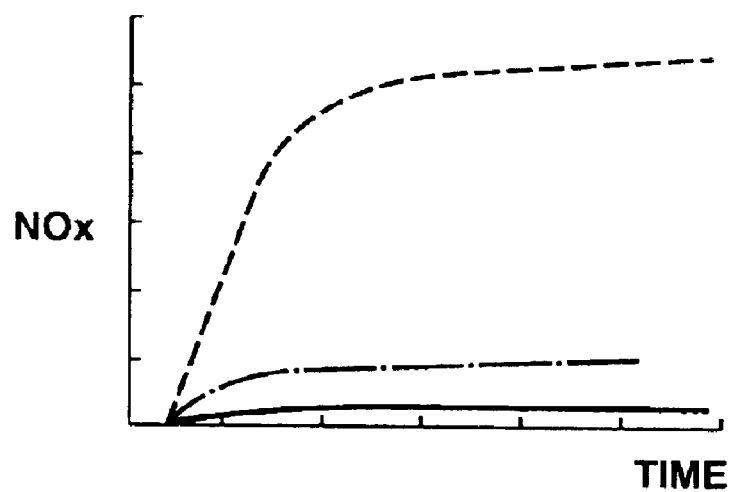
FIG. 46 is a graph depicting a time integral of NOx emissions according to the embodiment of the present invention.

In each of FIGS. 45 and 46, the illustrated fully drawn line indicates the emission performance of the above-mentioned embodiment according to the present invention.

In each of FIGS. 45 and 46, the illustrated dashed line indicates the emission performance when no special measure was carried out to rapidly increase the temperature of the catalyst upon and after cold start.

In each of FIGS. 45 and 46, the one-dot chain line indicates the emission performance when only post-ignition fuel injection technique was used to rapidly increase the temperature of the catalyst upon and after cold start.

While the present invention has been particularly described in conjunction with the exemplary embodiments, it is evident that many alternatives, modifications and variations will be apparent to those skilled in the art in light of foregoing description. It is therefore contemplated that the appended claims will embrace any such alternatives, modifications and variations as falling within the true scope and sprit of the present invention.

This application claims the priority of Japanese Patent Application No. P2001-228837, filed Jul. 30, 2001, the disclosure of which is hereby incorporated by reference in its entirety.

What is claimed is:

1. A method of controlling an internal combustion engine for warm-up of a catalyst of an exhaust gas treatment device located in the engine exhaust path, the engine including an exhaust gas recirculation (EGR) system driven in response to an EGR command signal to recirculate exhaust to an engine intake, the method comprising:

generating a warm-up demand for heating the catalyst subject to constraint on stable combustion;

determining a reduction in excess air ratio of the engine intake based on the warm-up demand;

modifying a desired value in excess air ratio by the reduction to provide a modified desired value in excess air ratio;

modifying a desired value in EGR rate based on the reduction to provide a modified desired value in EGR rate; and determining the EGR command signal based on the modified desired value in EGR rate.

2. The method as claimed in claim 1, wherein the warm-up demand is generated upon and after cold start of the engine.

3. The method as claimed in claim 1, wherein the warm-up demand is generated after a cylinder wall temperature has exceeded a cylinder wall temperature threshold when the catalyst has a temperature lower than a catalyst temperature threshold.

4. The method as claimed in claim 1, wherein the warm-up demand is generated after a time from the beginning of cold start has reached a time threshold when the catalyst has a temperature lower than a catalyst temperature threshold.

5. The method as claimed in claim 1, wherein the warm-up demand is generated after an idle fuel quantity has reached an idle fuel quantity threshold during cold start of the engine when the catalyst has a temperature lower than a catalyst temperature threshold.

6. The method as claimed in claim 1, wherein, after the engine has achieved self-sustaining operation during cold start of the engine, the warm-up demand is increased at a controlled rate of one of a difference between and a ratio between an idle fuel quantity and an idle fuel quantity threshold, and wherein the determining a reduction in excess air ratio includes increasing the reduction in amount as a function of the warm-up demand.

7. The method as claimed in claim 1, wherein, when a catalyst temperature threshold is exceeded, the warm-up demand is zero.

8. The method as claimed in claim 1, wherein, when a catalyst-out temperature threshold is exceeded, the warm-up demand is zero.

9. The method as claimed in claim 1, wherein, when a coolant temperature threshold is exceeded, the warm-up demand is zero.

10. The method as claimed in claim 1, wherein, when the integral of fuel quantity from the beginning of cold start of the engine exceeds a threshold, the warm-up demand is zero.

11. The method as claimed in claim 1, further comprising:

adjusting an EGR valve of the EGR system in response to the EGR command signal.

12. The method as claimed in claim 1, wherein the warm-up demand is generated accounting for in-cylinder combustion environment when the catalyst has a temperature lower than a catalyst temperature threshold.

13. The method as claimed in claim 12, wherein, when a second catalyst temperature threshold that is higher than the first mentioned catalyst temperature threshold is exceeded, the warm-up demand is zero.

14. The method as claimed in claim 1, wherein, after the engine has achieved self-sustaining operation during cold start of the engine, the warm-up demand is increased at a controlled rate of one of a difference between and a ratio between time and a time threshold, and wherein the determining a reduction in excess air ratio includes increasing the reduction in amount as a function of the warm-up demand.

15. The method as claimed in claim 14, wherein the time threshold is determined as a function of coolant temperature of the engine.

16. The method as claimed in claim 1, further comprising:

determining a throttle valve opening (TVO) command signal based on the modified desired value in excess air ratio; and adjusting a throttle valve located in the intake path in response to the TVO command signal.

17. The method as claimed in claim 16, further comprising:

determining a post-ignition fuel quantity based on the modified desired value in excess air ratio; and performing injection of the post-ignition fuel quantity after ignition of in-cylinder charge to heat the catalyst.

18. The method as claimed in claim 1, further comprising:

determining a variable geometry turbocharger (VGT) command signal based on the modified desired value in excess air ratio; and adjusting a variable geometry turbocharger (VGT) of the engine in response to the VGT command signal.

19. The method as claimed in claim 18, further comprising:

determining a post-ignition fuel quantity based on the modified desired value in excess air ratio; and performing injection of the post-ignition fuel quantity after ignition of in-cylinder charge to heat the catalyst.

20. An engine system comprising:

an engine block having a plurality of combustion chambers;

an intake manifold for supplying intake to the combustion chambers;

an exhaust manifold for discharging exhaust from the combustion chambers;

an exhaust gas treatment device including a catalyst located in the engine exhaust path communicating with the exhaust manifold;

an exhaust gas recirculation (EGR) system driven in response to an EGR command signal to recirculate exhaust to the engine intake path communicating with the intake manifold;

an engine controller; and a computer readable storage medium having instructions stored thereon that are executable by the engine controller to perform a method of controlling the internal combustion engine for warm-up of the catalyst, wherein the medium includes instructions for operating the engine controller to:

generate a warm-up demand for heating the catalyst subject to constraint on stable combustion;

determine a reduction in excess air ratio of the engine intake based on the warm-up demand;

modify a desired value in excess air ratio by the reduction to provide a modified desired value in excess air ratio;

modify a desired value in EGR rate based on the reduction to provide a modified desired value in EGR rate; and determine the EGR command signal based on the modified desired value in EGR rate.

21. The engine system as claimed in claim 20, further comprising a throttle valve, located in the engine intake path, which opens in response to a throttle valve opening (TVO) command signal, and wherein the computer readable storage medium further includes instructions for the engine controller to:

determine the TVO command signal based on the modified desired value in excess air ratio.

22. The engine system as claimed in claim 21, further comprising a variable geometry turbocharger (VGT) driven in response to a VGT command signal, and wherein the computer readable storage medium further includes instructions for the engine controller to:

determine the VGT command signal based on the modified desired value in excess air ratio.

23. The engine system as claimed in claim 22, further comprising a device to perform post-ignition injection of a post-ignition fuel quantity for heating the catalyst, and wherein the computer readable storage medium further includes instructions for the engine controller to:

determine the post-ignition fuel quantity based on modified desired values in excess air ratio.

24. The engine system as claimed in claim 23, wherein the computer readable storage medium further includes instructions for the engine controller to:

calculate a desired air quantity using the modified desired value in excess air ratio; and calculate a desired EGR gas quantity using the desired air quantity and the modified desired value in excess air ratio.

25. An apparatus for controlling an internal combustion engine for warm-up of a catalyst of an exhaust gas treatment device located in the engine exhaust path, the engine including an exhaust gas recirculation (EGR) system driven in response to an EGR command signal to recirculate exhaust to an engine intake, the apparatus comprising:

a logic block that generates a warm-up demand for heating the catalyst subject to constraint on stable combustion;

a reduction block that determines a reduction in excess air ratio of the engine intake based on the warm-up demand;

an excess air ratio modifier block that modifies a desired value in excess air ratio by the reduction to provide a modified desired value in excess air ratio;

an EGR rate modifier block that modifies a desired value in EGR rate based on the reduction to provide a modified desired value in EGR rate; and an EGR controller that determines the EGR command signal based on the modified desired value in EGR rate.

26. The apparatus as claimed in claim 25, wherein the logic block determines whether a need remains for warm-up of the catalyst;

the logic block determines whether in-cylinder combustion environment allows for engine operation with reduced excess air ratio to increase the temperature of the catalyst; and the logic block generates the warm-up demand when the in-cylinder combustion environment allows for the engine operation under the presence of the need.

27. The apparatus as claimed in claim 25, where the logic block determines whether a need remains for warm-up of the catalyst;

the logic block determines whether the engine has achieved self-sustained operation;

the logic block increases warm-up demand at a controlled rate after the engine has achieved self-sustained operation; and the logic block generates the warm-up demand under the presence of the need.

28. The apparatus as claimed in claim 25, further comprising:

an air quantity calculation block that calculates a desired air quantity based on the modified desired value in excess air ratio; and an EGR gas quantity calculation block that calculates a desired EGR gas quantity based on the desired air quantity and the modified desired value in EGR rate.

29. The apparatus as claimed in claim 28, wherein the EGR controller receives the desired EGR gas quantity and engine speed.

30. The apparatus as claimed in claim 29, further comprising:

a throttle valve (TV) controller that receives the desired air quantity and engine speed to determine a TV command signal; and a variable geometry turbocharger (VGT) controller that receives the desired air quantity and engine speed to determine a VGT command signal.

31. The apparatus as claimed in claim 25, further comprising:

a set-point generating block that establishes set-point values of engine operating variables, which include excess air ratio and EGR rate, for engine speed and fuel quantity conditions; and wherein the excess air ratio modifier block receives a set-point value of excess air ratio established by the set-point generating block to determine the desired value in excess air ratio; and wherein the EGR rate modifier block receives a set-point value of EGR rate established by the set-point generating block to determine the desired value in EGR rate.

32. The apparatus as claimed in claim 31, wherein the EGR rate modifier block receives the modified desired value in excess air ratio and the reduction in excess air ratio and determines a correction coefficient, and multiplies the correction coefficient with the desired value in EGR rate to determine the modified desired value in EGR rate.

33. A computer readable storage medium having instructions stored thereon that are executable by a controller to perform a method of controlling an internal combustion engine for warm-up of a catalyst of an exhaust gas treatment device located in the engine exhaust path, the engine including an exhaust gas recirculation (EGR) system driven in response to an EGR command signal to recirculate exhaust to an engine intake, the computer readable storage medium comprising:

instructions for generating a warm-up demand for heating the catalyst subject to constraint on stable combustion;

instructions for determining a reduction in excess air ratio of the engine intake based on the warm-up demand;

instructions for modifying a desired value in excess air ratio by the reduction to provide a modified desired value in excess air ratio;

instructions for modifying a desired value in EGR rate based on the reduction to provide a modified desired value in EGR rate; and instructions for determining the EGR command signal based on the modified desired value in EGR rate.

34. The computer readable storage medium as claimed in claim 33, wherein the instructions for generating a warm-up demand include:

instructions for determining whether a need remains for warm-up of the catalyst;

instructions for determining whether in-cylinder combustion environment allows for engine operation with reduced excess air ratio to increase the temperature of the catalyst; and instructions for generating the warm-up demand when the in-cylinder combustion environment allows for the engine operation under the presence of the need.

35. The computer readable storage medium as claimed in claim 33, wherein the instructions for generating a warm-up demand include:

instructions for determining whether a need remains for warm-up of the catalyst;

instructions for determining whether the engine has achieved self-sustained operation;

instructions for increasing warm-up demand at a controlled rate after the engine has achieved self-sustained operation; and instructions for generating the warm-up demand under the presence of the need.

36. A computer readable storage medium having instructions stored thereon that are executable by a controller to perform a method of controlling an internal combustion engine for warm-up of a catalyst of an exhaust gas treatment device located in the engine exhaust path, the engine including an exhaust gas recirculation (EGR) system driven in response to an EGR command signal to recirculate exhaust to an engine intake, the computer readable storage medium comprising:

instructions for determining whether a need remains for warm-up of the catalyst;

instructions for determining whether an in-cylinder combustion environment allows for engine operation with reduced excess air ratio to increase the temperature of the catalyst; and instructions for generating a warm-up demand when the in-cylinder combustion environment allows for the engine operation under the presence of the need.

37. A computer readable storage medium having instructions stored thereon that are executable by a controller to perform a method of controlling an internal combustion engine for warm-up of a catalyst of an exhaust gas treatment device located in the engine exhaust path, the engine including an exhaust gas recirculation (EGR) system driven in response to an EGR command signal to recirculate exhaust to an engine intake, the computer readable storage medium comprising:

instructions for determining whether a need remains for warm-up of the catalyst;

instructions for determining whether the engine has achieved self-sustained operation;

instructions for increasing warm-up demand at a controlled rate after the engine has achieved self-sustained operation; and instructions for generating a warm-up demand under the presence of the need.

* * * * *